US009180713B2

(12) United States Patent
Aihara

(10) Patent No.: US 9,180,713 B2
(45) Date of Patent: Nov. 10, 2015

(54) PRINTING APPARATUS WITH CONTROLLER FOR PREVENTING WARPING OF INTERMEDIATE TRANSFER FILM AND PRINTING METHOD FOR THE SAME

(71) Applicants: TOPPAN PRINTING CO., LTD., Taito-ku, Tokyo (JP); NISCA CORPORATION, Minamikoma-gun, Yamanashi (JP)

(72) Inventor: Yuichi Aihara, Yamanashi (JP)

(73) Assignees: TOPPAN PRINTING CO., LTD., Tokyo (JP); NISCA CORPORATION, Minamikoma-gun, Yamanashi-ken (JP)

( * ) Notice: Subject to any disclaimer, the term of this patent is extended or adjusted under 35 U.S.C. 154(b) by 0 days.

(21) Appl. No.: 14/361,587

(22) PCT Filed: Dec. 3, 2012

(86) PCT No.: PCT/JP2012/081242

§ 371 (c)(1),
(2) Date: May 29, 2014

(87) PCT Pub. No.: WO2013/081163

PCT Pub. Date: Jun. 6, 2013

(65) Prior Publication Data

US 2014/0331873 A1 Nov. 13, 2014

(30) Foreign Application Priority Data

Dec. 1, 2011 (JP) ................................ 2011-263955

(51) Int. Cl.
*B41J 3/407* (2006.01)
*B41J 29/38* (2006.01)

(Continued)

(52) U.S. Cl.
CPC .......... *B41M 5/38257* (2013.01); *B41J 2/0057* (2013.01); *B41J 2/325* (2013.01); *B41J 3/407* (2013.01); *B41J 29/38* (2013.01); *B41M 5/0256* (2013.01); *G03G 15/1615* (2013.01)

(58) Field of Classification Search
CPC .... B41J 13/12; B41J 2/0057; B41J 2002/012; B41M 5/0256; B41M 5/38257; B41F 16/0006; B41F 16/0026
See application file for complete search history.

(56) References Cited

U.S. PATENT DOCUMENTS

| | | | | |
|---|---|---|---|---|
| 6,664,993 | B2 * | 12/2003 | Isono | 347/213 |
| 2001/0010535 | A1 * | 8/2001 | Andoh et al. | 347/213 |
| 2008/0050140 | A1 * | 2/2008 | Oku | 399/71 |

FOREIGN PATENT DOCUMENTS

| | | | |
|---|---|---|---|
| JP | H08-305230 | A | 11/1996 |
| JP | H10-119360 | A | 5/1998 |
| JP | 2005-096476 | A | 4/2005 |
| JP | 2006-095718 | A | 4/2006 |

(Continued)

OTHER PUBLICATIONS

PCT/ISA/210, "International Search Report for PCT/JP2012/081242", Jan. 2013.

*Primary Examiner* — Daniel J Colilla
(74) *Attorney, Agent, or Firm* — Manabu Kanesaka

(57) ABSTRACT

When an image formed on an intermediate transfer film is heat-transferred to a recording medium, the film surface is prevented from being deteriorated or distorted due to heat so as to enable high-quality printing. The printing apparatus of the present invention comprises a recording medium supply unit, an image formation unit which forms the image on the transfer film, a transfer unit which transfers the image on the transfer film to the recording medium, a film supply unit which supplies the transfer film, a film winding unit which winds the film, a media transport path which transports the recording medium sent from a medium supply unit to the transfer unit through an information recording unit, a film transport path which transports the transfer film sent from the film supply unit to the transfer unit through the image formation unit, a film delay unit which temporarily delays the transfer film disposed at the film transport path, a driving means which is connected to at least one of the film supply unit and the film winding unit, and a control means which controls the driving means.

13 Claims, 15 Drawing Sheets

31 Se8 30 29
Used film part 46e
Card Waiting
46g
Image forming film surface
film Waiting
47 33 Se9
P4
Mr1
Mr2
49
41 (Ink ribbon)
Blank film part 46b
44
45
fu1
42
Mr3
43
40
48
Se11 46e
Used film part
Se10

(51) Int. Cl.

| | |
|---|---|
| ***B41J 2/325*** | (2006.01) |
| ***B41M 5/382*** | (2006.01) |
| ***B41M 5/025*** | (2006.01) |
| ***B41J 2/005*** | (2006.01) |
| ***G03G 15/16*** | (2006.01) |

(56) References Cited

FOREIGN PATENT DOCUMENTS

| | | | |
|---|---|---|---|
| JP | 4337582 | B2 | 7/2009 |
| JP | 2011-136783 | A | 7/2011 |

* cited by examiner

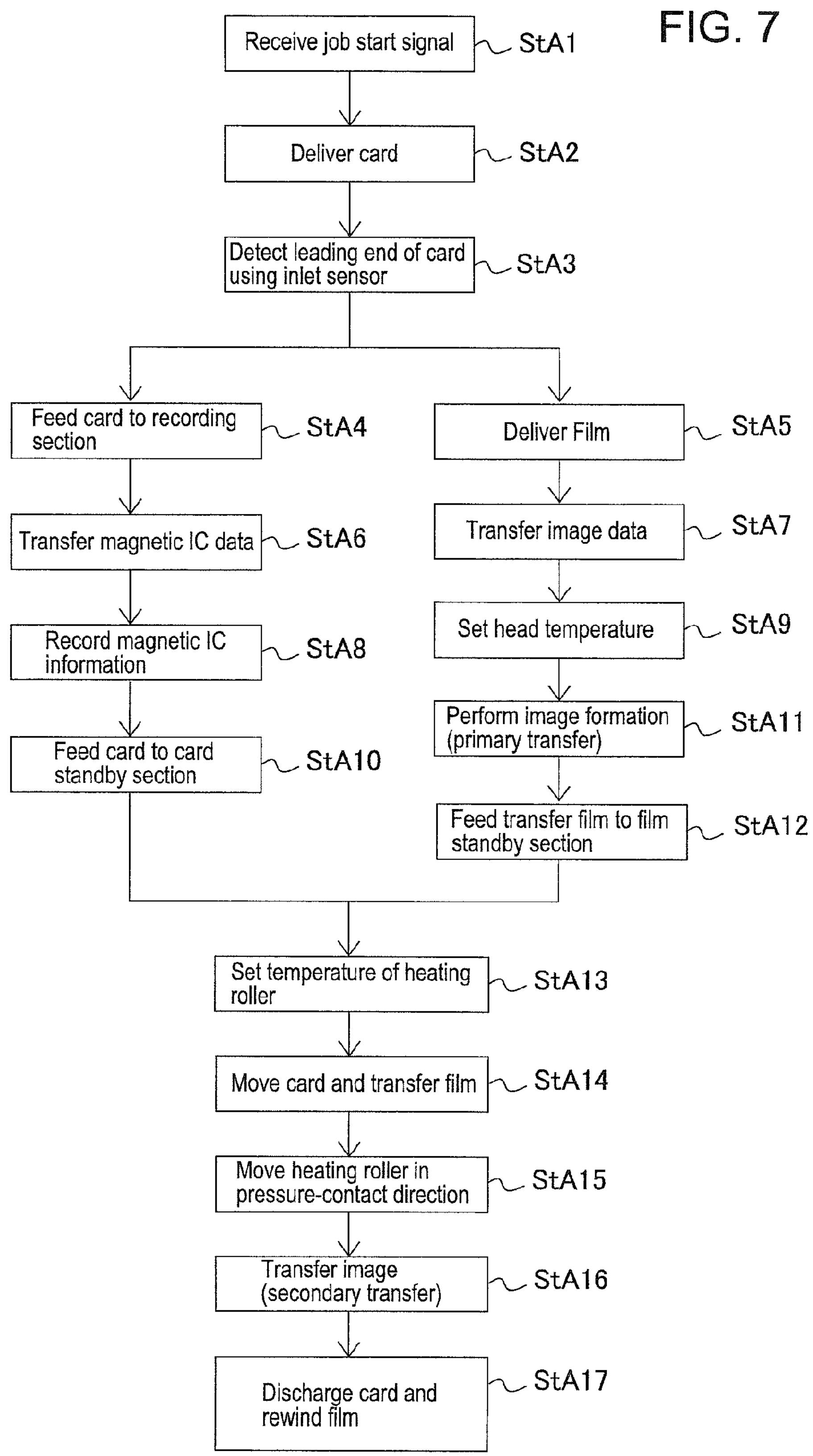
FIG. 7
Receive job start signal
StA1
Deliver card
StA2
Detect leading end of card using inlet sensor
StA3
Feed card to recording section
StA4
Deliver Film
StA5
Transfer magnetic IC data
StA6
Transfer image data
StA7
Record magnetic IC information
StA8
Set head temperature
StA9
Feed card to card standby section
StA10
Perform image formation (primary transfer)
StA11
Feed transfer film to film standby section
StA12
Set temperature of heating roller
StA13
Move card and transfer film
StA14
Move heating roller in pressure-contact direction
StA15
Transfer image (secondary transfer)
StA16
Discharge card and rewind film
StA17

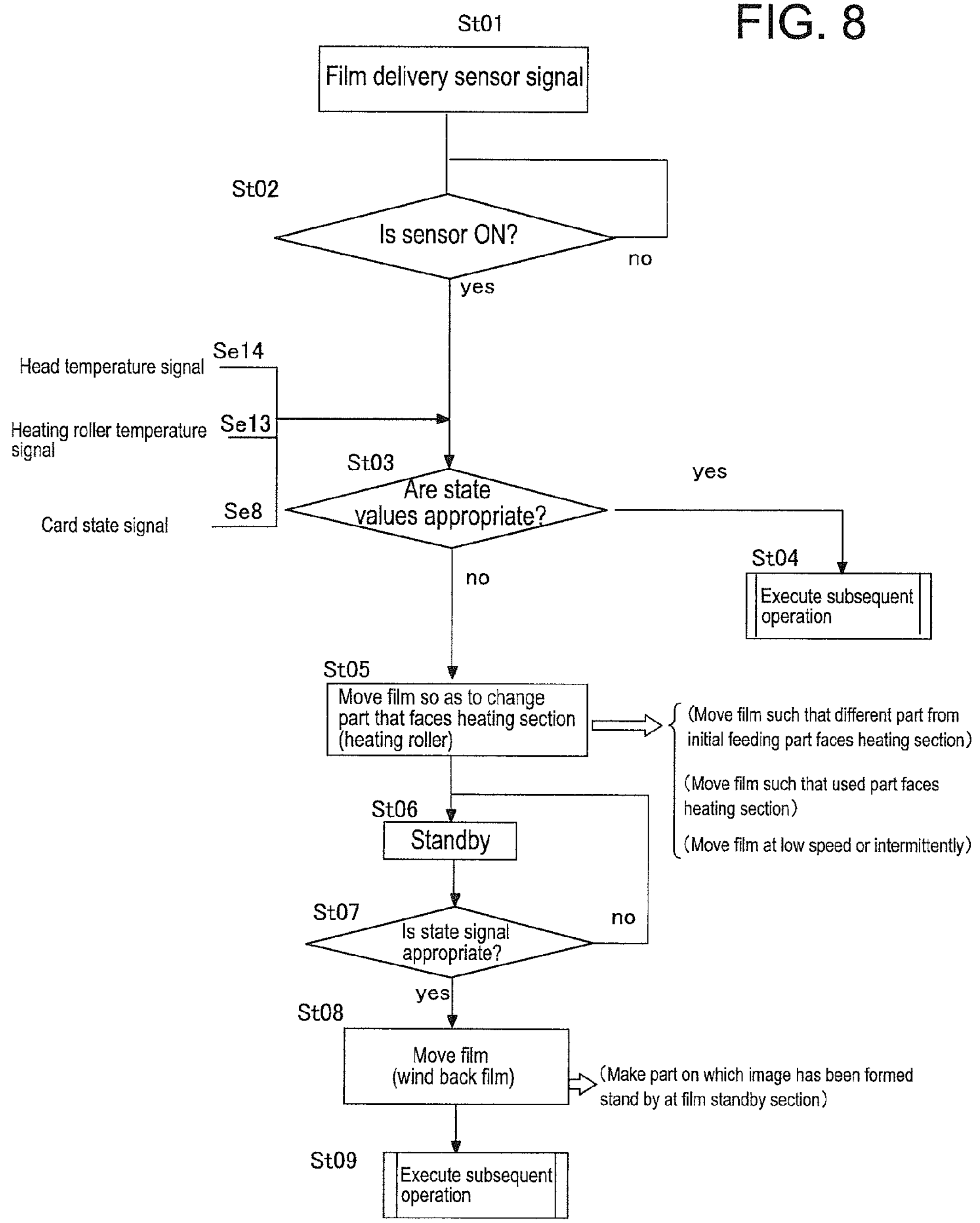

FIG. 8
St01
Film delivery sensor signal
St02
Is sensor ON?
no
yes
Se14
Head temperature signal
Se13
Heating roller temperature signal
Se8
Card state signal
St03
Are state values appropriate?
yes
St04
Execute subsequent operation
no
St05
Move film so as to change part that faces heating section (heating roller)
(Move film such that different part from initial feeding part faces heating section)
(Move film such that used part faces heating section)
(Move film at low speed or intermittently)
St06
Standby
St07
Is state signal appropriate?
no
yes
St08
Move film (wind back film)
(Make part on which image has been formed stand by at film standby section)
St09
Execute subsequent operation

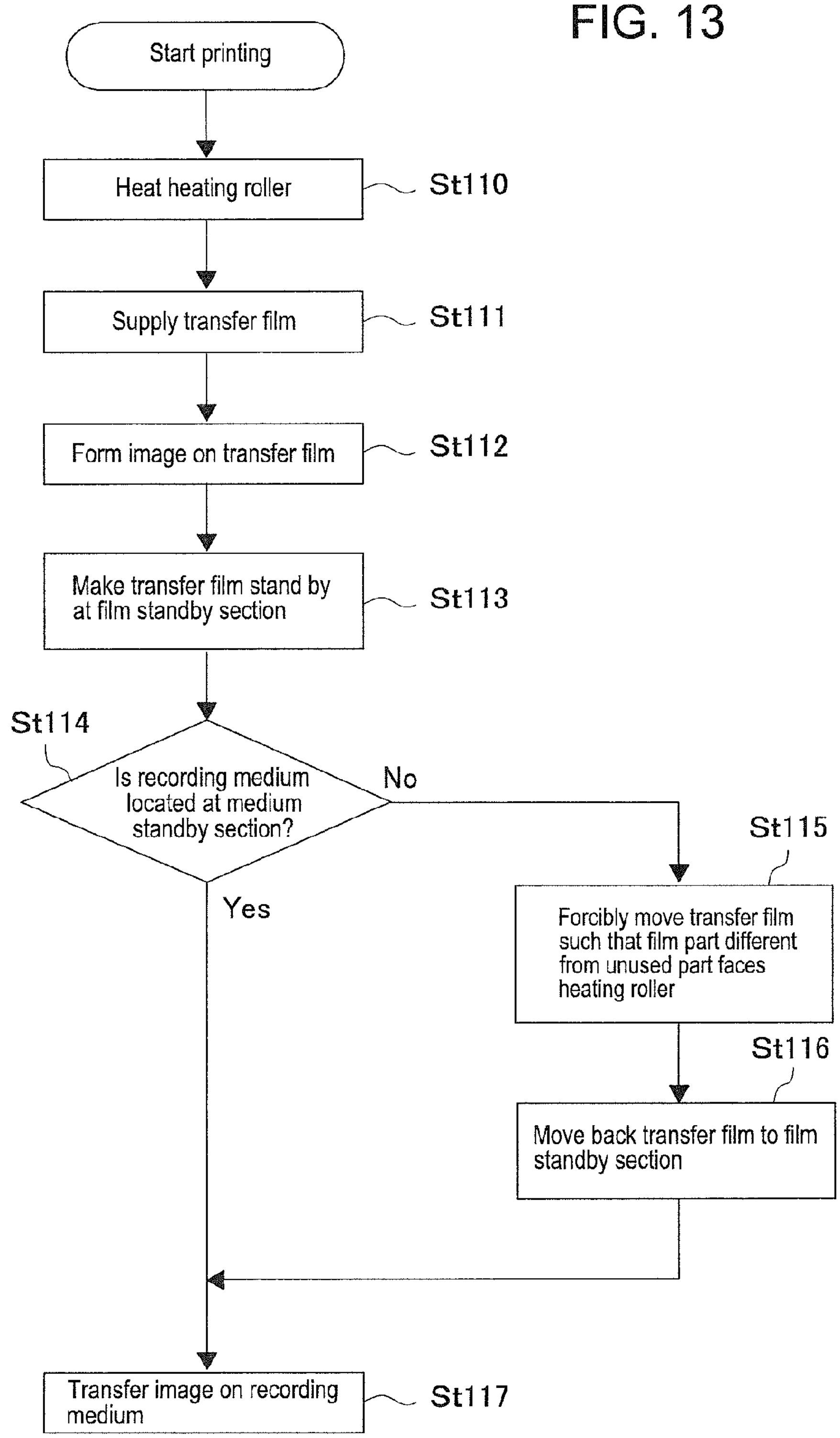
FIG. 13
Start printing
Heat heating roller
St110
Supply transfer film
St111
Form image on transfer film
St112
Make transfer film stand by at film standby section
St113
St114
Is recording medium located at medium standby section?
No
Yes
St115
Forcibly move transfer film such that film part different from unused part faces heating roller
St116
Move back transfer film to film standby section
Transfer image on recording medium
St117

PRINTING APPARATUS WITH CONTROLLER FOR PREVENTING WARPING OF INTERMEDIATE TRANSFER FILM AND PRINTING METHOD FOR THE SAME

RELATED APPLICATIONS

The present application is National Phase of International Application No. PCT/JP2012/081242 filed Dec. 3, 2012, and claims priority from Japanese Application No. 2011-263955, filed Dec. 1, 2011.

TECHNICAL FIELD

The present invention relates to printing apparatus and a printing method that form an image based on text data, image data, and the like on a recording medium such as a card and further relates to improvement of intermediate transfer printing that transfers an image temporarily formed on an intermediate transfer film onto a recording medium.

BACKGROUND ART

In general, an apparatus of such a type is known as an output apparatus that prints image data such as a face picture onto a recording medium such as a plastic card. For example, a large volume printing system is not suitable for printing of a certification card such as a driver's license, a membership card, or an ID card due to its inclusion of personal information.

Thus, recently, a multi-purpose printing system integrated into a computer network and configured to simultaneously perform printing of a face picture and its accompanying text and recording of electronic data such as personal information is used as on-demand printing. As a printing system, sublimation ribbon transfer, wax ribbon transfer, inkjet printing, electrostatic printing, and the like are used.

Among various printing methods as above, an intermediate transfer printing method is used when irregularities are formed on a surface of the recording medium and when a hologram or the like is coated on the recording medium surface. The intermediate transfer printing method is known as a method that forms a primary image on an intermediate transfer film (hereinafter, referred to as "transfer film") and then transfers the primary image formed on the transfer film onto the recording medium by means of a downstream side platen and is used for a medium having irregularities on a surface thereof, a medium requiring surface coating, and the like.

Such an intermediate transfer printing apparatus is disclosed in, for example, Patent Document 1. An image is formed on a transfer film at a primary transfer (printing) position, and the transfer film is fed to a downstream side transfer platen. At the same time, a recording medium such as a card is fed to the transfer platen, and the image on the transfer film is transferred onto the recording medium by means of the transfer platen (while heat is applied by a heating roller).

In the apparatus of Patent Document 1, the transfer film is fed from a supply roll (supply spool) to a winding roll (winding spool). A printing platen for primary transfer and a transfer platen for secondary transfer are provided between the supply spool and winding spool. A feeding direction of the transfer film and a feeding direction of the recording medium are set in the same direction.

Thus, the transfer film delivered from the supply roll is subjected to image formation by means of the printing platen, and the image formed on the transfer film is transferred onto the recording medium such as a card by means of the transfer platen provided on the downstream side of the printing platen. As described above, the transfer film is fed in one direction, and the supply roll, printing platen, transfer platen, and winding roll are arranged in this order along the film feeding direction.

A heating roller is disposed opposite to the transfer platen. The heating roller holds the transfer film and recording medium between itself and transfer platen, brings them into pressure contact with each other, and applies heating thereto to thereby transfer the image on the transfer film onto the recording medium. The heating roller is configured to be movable between an operating position at which it is brought into pressure contact with the transfer platen and a retreating position at which it is positioned spaced apart from the operating position and is provided with a shifting unit such as a cam.

Such a feeding method has a problem in that the intermediate transfer film is consumed more than necessary due to a variation in position of a card rear end (print terminating end). That is, the heating roller cannot (almost impossible) be separated from the card simultaneously with the termination of printing on the card rear end due to length error of the card and card feeding precision error, so that a print terminating portion of the transfer film is brought into contact with the heating roller to be consumed.

More specifically, in this feeding method, a contact surface with the heating roller is generated at its rear end portion of the intermediate transfer film due to the variation in position of the card rear end (print terminating end). The film surface that has contacted the heating roller cannot be used any more. That is, an unnecessary heated portion is generated every time printing is performed at the print terminating end portion, and the print terminating end portion is inevitably consumed.

Patent Document 2 proposes a film feeding method in which a feeding direction of the transfer film and a feeding direction of the card are set in opposite directions so as to eliminate the above-described waste of the transfer film. More specifically, in method of the Patent Document 2, the transfer film is delivered from the supply roll, through the transfer platen, to the downstream side printing platen, where the transfer film is subjected to image formation and, thereafter, the resultant transfer film is switched back (back-fed) to be fed in the same direction as the card feeding direction to the transfer platen.

According to the feeding method of Patent Document 2, the waste of the transfer film can be eliminated. That is, the rear end portion of the film onto which the image has been transferred by means of the transfer platen is followed by a spent film, surface, thus preventing a surplus heated portion from being generated by the heating roller.

CITATION LIST

Patent Document

Patent Document 1: Japanese Patent No. 4,337,582 (FIG. 1)

Patent Document 2: Jpn. Pat. Appln. Laid-Open Publication No. 2011-136783 (FIG. 1)

DISCLOSURE OF THE INVENTION

Problems to be Solved by the Invention

The following problem occurs in both the methods disclosed in Patent Documents 1 and 2. The printing platen is provided on a traveling path of the transfer film, and an image is formed (for example, image transfer using an ink ribbon and a thermal head) on the transfer film by means of the printing platen. After the image formation, the transfer film stands by at a predetermined position on the upstream side of the transfer platen.

On the other hand, electronic information is recorded in the recording medium. The recording medium delivered from a medium supply section is subjected to recording of electronic information such as magnetic information, IC information, or barcode information as needed and, after the recording of the electronic information, stands by at a predetermined position on the upstream side of the transfer platen.

When the transfer film and recording medium are set in the both standby position (set in a state of readiness), an apparatus controller feeds the transfer film and recording medium toward the transfer platen at the same speed. At the same time, the heating roller disposed opposite to the transfer platen is shifted from the retreating position at which it is positioned spaced apart from the platen to operating position at which it is brought into pressure contact with the platen. With this operation, the transfer film and recording medium are pressurized and heated by the platen and heating roller to thereby transfer and fix the image on the film on the recording medium.

When the transfer film is made to stand by in a standstill state for a long time in the course of the above operation, the film surface continues to be exposed to heat from the heating roller. In this case, it is preferable to make the heating roller retreat to a position spaced far apart from the platen position; however, to make the apparatus compact, the heating roller cannot help being disposed at a position close to the transfer film in the standby state.

As described above, to make the apparatus compact, the heating roller and the traveling path of the transfer film cannot help being disposed close to each other in a small space. In addition, to achieve high-speed processing, it is necessary to raise a temperature of the heating roller to a high level. Therefore, when the transfer film is made to stand by at the standby position for a long time, there arise problems of alteration of a coating layer on the film surface and warping of the film itself.

In particular, when an unused part (blank part) of the transfer film is exposed to the heating roller for a long time as in the above-described patent Document 2, a film surface to be subjected to image formation is altered by heat to adversely affect image quality, and the film itself is warped to cause image distortion.

Thus, the present inventor has reached the following idea. That is, a condition under which the transfer film is exposed to the heating roller for a long time is analyzed and, in a case where the film is made to stand by for a long time, a film area opposed to a heating section is changed with time.

An object of the present invention is to provide a printing apparatus capable of preventing, when an image formed on an intermediate transfer film is heat-transferred onto a recording medium, a surface of the intermediate transfer film from being altered or warped due to heat and thus of obtaining high-quality printing. Another object of the present invention is to prevent, upon heat-transfer of the printed image, heat from adversely affecting an unused part (blank part) of the transfer film.

Means for Solving the Problems

To attain the above objects, the present invention is featured in that when an image formed on a transfer film is transferred onto a recording medium, the transfer film is moved such that the same part of the transfer film does not face a heating roller (heating member) for a predetermined time or more in the course of making the recording medium and transfer film stand by on the upstream side of the transfer section.

More in detail, the present invention is an apparatus that transfers an image formed on a transfer film onto a recording medium. The apparatus includes: a medium supply section configured to supply the recording medium; an image forming section configured to form an image on the transfer film; a transfer section configured to transfer the image formed on the transfer film onto the recording medium; a film supply section configured to supply the transfer film; a film winding section configured to winding the transfer film supplied from the film supply section; a medium conveying path along which the recording medium supplied from the medium supply section is conveyed to the transfer section through an information recording section; a film conveying path provided in the medium conveying path, along which the transfer film supplied from the film supply section is conveyed to the transfer section through the image forming section; a film standby section provided on the film conveying path, at which the transfer film is made to stand by temporarily; a drive unit connected to at least one of the film supply section and film winding section; and a controller configured to control the drive unit.

The transfer section is provided with a transfer platen that supports the recording medium and a heating member that press holds the recording medium and transfer film with the transfer platen, and the controller moves, when making the transfer film to be conveyed from the film supply section to the transfer section stand by temporarily, the transfer film such that a film part that faces the heating member is changed to another film part in a case where the same film part is exposed to the heating member for a predetermined time period or more.

The present invention further provides a printing method that uses a printing apparatus provided with an image forming section that forms an image on a transfer film and a transfer section that transfers the image formed on the transfer film onto a recording medium using a heating member and a transfer platen. The method includes: a heating step of heating the heating member; a film supply step that supplies the transfer film; a film standby step that makes the transfer film temporarily in a state where an unused part of the transfer film is positioned between the heating member and transfer platen; a determination step that determines whether the unused part of the transfer film in a state of being stopped for a certain time period between the heating member and transfer platen can be moved for subsequent processing; a film winding step of forcibly moving the transfer film, when it is determined by the determination step that the transfer film cannot be moved, such that a different film part of the transfer film faces the heating member.

Advantages of the Invention

According to the present invention, when the transfer film to be fed to the transfer section is made to stand by temporarily, the transfer film is moved to change a part on the transfer film that faces the heating member so as to prevent the same portion of the transfer film from being exposed to the heating member for a predetermined time period or more. Thus, the following effects can be obtained.

It is possible to prevent the same part of the transfer film from being exposed to the heating member (heating roller) for a predetermined time or more, which prevents the transfer film from being altered or deformed due to heat. Further, the heating member can be set to a comparatively high temperature, allowing high-speed image transfer processing. At the same time, by setting a retreating position of the heating member at a position adjacent to the transfer film, a moving stroke of the heating member can be shortened, thereby achieving size reduction of the apparatus.

Further, in the present invention, by making the used part (film part that has been subjected to image transfer) of the transfer film face the heating member when the transfer film is made to stand by, alteration of the film surface does not affect the subsequent image formation, thereby enhancing quality of a transferred image.

BRIEF DESCRIPTION OF THE DRAWINGS

FIG. 7 is an explanatory view illustrating a procedure of information recording operation in the control configuration of FIG. 6.

FIG. 8 is an explanatory view illustrating an embodiment (first embodiment) of a control configuration of a transfer film feeding mechanism in the present invention.

FIG. 13 is a flowchart illustrating a concrete control method when the printing method of FIG. 12 is used for the image transfer section B.

BEST MODE FOR CARRYING OUT THE INVENTION

Figure 1:
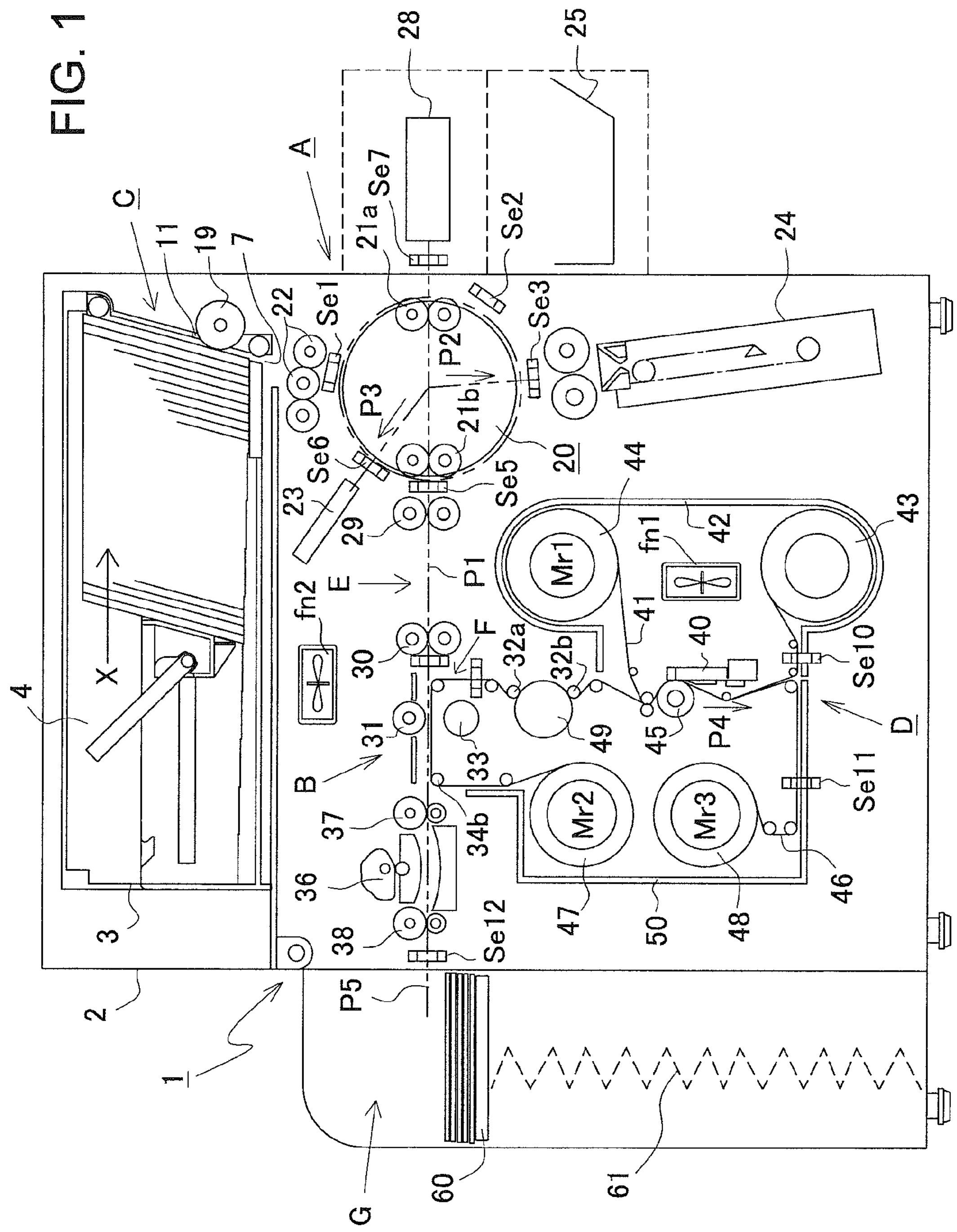
FIG. 1 is an explanatory view of an entire configuration of a printing apparatus according to the present invention.

The present invention will be described below based on illustrated preferred embodiments. FIG. 1 is an explanatory view of an entire configuration of a printing apparatus 1 according to the present invention. This printing apparatus performs "information recording" of recording information such as magnetic information and IC information in an ID card for various certification purposes or a credit card for commercial transactions and "image formation (printing)" of forming images such as a text, a photo, and a mark.

To this end, the printing apparatus 1 includes an apparatus housing 2, an information recording section A, an image transfer section B, a medium supply section C, and an image forming section D. An image is formed on an intermediate transfer film 46 in the image forming section D, and the image is transferred onto a recording medium delivered from the medium supply section C. Further, as a pre-process of the image transfer, magnetic information, IC information, and the like are recorded in the recording medium.

Functions of the above sections will be described based on FIG. 1. The apparatus housing 2 has the medium supply section C and a reversing unit 20 that changes a travel direction of a recording medium (hereinafter, referred to as "card") fed from the medium supply section C. A first conveying path P1 for conveying the card in a first direction and a second conveying path P2 for conveying the card in a second direction are disposed on the downstream side of the reversing unit 20. Further, in addition to the second conveying path P2, a third conveying path P3 is disposed so as to convey the card in a third direction from the reversing unit 20.

The medium supply section C is constituted by a sheet supply cassette 3 that houses a plurality of cards such that they are arranged front and rear in an array in a standing posture, and a direction (direction of an arrow X of FIG. 1) in which the card is delivered and a card conveying direction of the first conveying path P1 are opposite and substantially parallel to each other. The sheet supply cassette 3 and first conveying path P1 are disposed above and below in parallel to each other and, accordingly, a card housing area and an image transfer mechanism (transfer platen 31 to be described later and first conveying path P1) are disposed above and below in parallel to each other to improve component arrangement density in the apparatus.

The reversing unit 20 is disposed adjacent to and below the medium supply section C and disposed at one end side (right side of FIG. 1) of the apparatus housing 2. The first and second conveying paths P1 and P2 are disposed on the downstream side of the reversing unit 20 so as to extend in a substantially horizontal direction and substantially a vertical direction, respectively. The first and second conveying paths P1 and P2 are disposed so as to extend in different directions, and an angle formed by the two directions is preferably in a range of 90° to 180°. However, the above angle may be set in an appropriate range considering an arrangement density of the conveying paths.

A medium standby section E and the image transfer section B are disposed on the first conveying path P1. The medium standby section E is disposed between the reversing unit 20 and image transfer section B. The image transfer section B is constituted by a transfer platen (platen roller in FIG. 1) 31 and configured to transfer an image on a surface (lower surface in FIG. 2) of the card while backing up and supporting the card. A heating roller 33 is disposed opposite to the transfer platen 31 so as to be moved up and down between a position spaced apart from the card and a position contacting the card.

A transfer film 46 is wound between the transfer platen 31 and heating roller. The illustrated one is constituted by a film cassette 50, and the film cassette 50 is disposed, together with a ribbon cassette 42 to be described later, below the first conveying path P1.

A film path P4 (hereinafter, referred to as "film conveying path") is formed such that the transfer film 46 housed in the film cassette 50 travels between the transfer platen 31 and image forming section D. The image forming section D is disposed below the first conveying path P1 at a position corresponding to an arrangement space of the medium standby section E of the first conveying path P1. The image forming section D is constituted by an image forming platen 45 and a thermal head 40 disposed opposite to the platen, and an ink ribbon 41 travels between the image forming platen 45 and thermal head 40. A configuration of the ink ribbon 41 will be described later together with a configuration of a ribbon cassette 42.

The reversing unit 20 and medium standby section E which are disposed on the first conveying path P1 are positioned above the image forming section D having the above configuration, and the second conveying path P2 and information recording section A (magnetic recording mechanism) thereof are positioned to the side of the image forming section D. The ribbon cassette 42 and film cassette 50 are disposed in this order between the reversing unit 20 of the first conveying path P1 and image transfer section B.

The first conveying path P1 and second conveying path P2 are disposed so as to extend from the reversing unit 20 in different directions as described above, and the ribbon cassette 42 and film cassette 50 are disposed within an area surrounded by the both paths P1 and P2 to form an intermediate transfer area. The medium standby section E is disposed on the first conveying path P1 at a position between the reversing unit 20 and image transfer section B, and the image forming section D is disposed below the medium standby section E. Such a layout improves a component arrangement density in the apparatus, thereby achieving compactness of the apparatus.

[Configuration of Medium Supply Section]

The medium supply section C is formed as a hopper mechanism that houses the plurality of cards. The illustrated hopper mechanism is constituted by the sheet supply cassette 3 detachably attached to the apparatus housing 2. As illustrated in FIG. 1, the sheet supply cassette 3 includes a box-shaped cassette casing and a card housing portion 4 provided in the cassette casing. The card housing portion 4 has a housing space adapted to a dimension of the card and can house the plurality of cards such that they are arranged in an array in a standing posture.

The card housing portion 4 has a picker opening 11 at which a pickup roller 19 is engaged with a surface of a frontmost card, as illustrated in FIG. 1. The picker opening 11 is formed as an opening at which the pickup roller 19 is engaged with the frontmost card so as to deliver the frontmost card through a sheet supply opening 7.

[Configuration of Reversing Section]

The reversing section (hereinafter, referred to as "reversing unit") 20 will be described. As illustrated in FIG. 1, carrying-in rollers 22 are disposed on the downstream side of the sheet supply opening 7 of the sheet supply cassette 3. The card delivered from the sheet supply cassette 3 is fed to the reversing unit 20 by means of the carrying-in rollers 22. The reversing unit 20 includes a unit frame bearing-supported by an apparatus frame (not illustrated) so as to be turnable and a pair of rollers or a plurality of pairs of rollers supported by the unit frame.

In the reversing unit 20 illustrated, two roller pairs 21*a* and 21*b* arranged front and rear with a space therebetween are rotatably axially supported by the unit frame. The unit frame is configured to be turned in a predetermined angle direction by a turning motor (pulse motor, etc.), and the roller pairs 21*a* and 21*b* mounted to the unit frame are each configured to be rotated in forward and backward directions by a conveying motor. Although not illustrated, in a drive mechanism for the unit frame and roller pairs 21*a*, 21*b*, turning of the unit frame and rotation of the roller pairs are switched therebetween through a clutch mechanism using a single pulse motor.

Thus, the cards prepared in the sheet supply cassette 3 are delivered by the pickup roller 19, separated one from another at a separation gap of the sheet supply opening 7, and fed to the downstream side reversing unit 20. Then, the card is introduced into the reversing unit 20 by means of the roller pairs 21*a* and 21*b* and tilted in posture in a predetermined angle direction in a state of being nipped by the roller pairs.

The first conveying path 91, second conveying path P2, and third conveying path P3, details of which will be described later, are disposed on the downstream side of the reversing unit 20 so as to extend in the respective angle directions. The second conveying path P2 incorporates therein a magnetic recording unit 24, which records magnetic information in a magnetic stripe of the card fed from the reversing unit 20. The illustrated magnetic recording unit 24 is constituted by a read/write head and is configured to, simultaneously with recording of the magnetic information, read the recorded information for right/wrong determination.

The third conveying path P3 incorporates therein a non-contact IC recording unit, which records information in an IC previously incorporated in the recording medium. Further, a reject stacker 25 and a barcode reader 28 are disposed at an outer periphery of the reversing unit 20 in a turning direction thereof. The barcode reader 28 is a unit that reads a barcode printed by the image forming section D to be described later for right/wrong determination (error determination).

Thus, when the card tilted in posture in a predetermined angle direction in the reversing unit 20 is fed, by means of the roller pairs 21*a* and 21*b*, to the recording unit 24 (or 23), data can be input magnetically or electrically on the card. When a recording mistake occurs in the data input unit, the card is discharged to the reject stacker 25.

[Configuration of First Conveying Path]

The first conveying path P1 is disposed on the downstream side of the reversing unit 20. The image transfer section B is disposed on the first conveying path P1 and forms an image on the card fed from the reversing unit 20. First and second roller pairs (which may be realized by a belt) 29 and 30 are disposed on the first conveying path P1 at a position on the upstream side of the image transfer section B and connected to a not illustrated conveying motor. The first and second roller pairs 29 and 30 can each be switched between forward and backward rotation, thereby allowing the card to be conveyed from the reversing unit 20 to the image transfer section B and, conversely, from the image transfer section B to the reversing unit 20.

[Configuration of Medium Standby Section]

Figure 2:
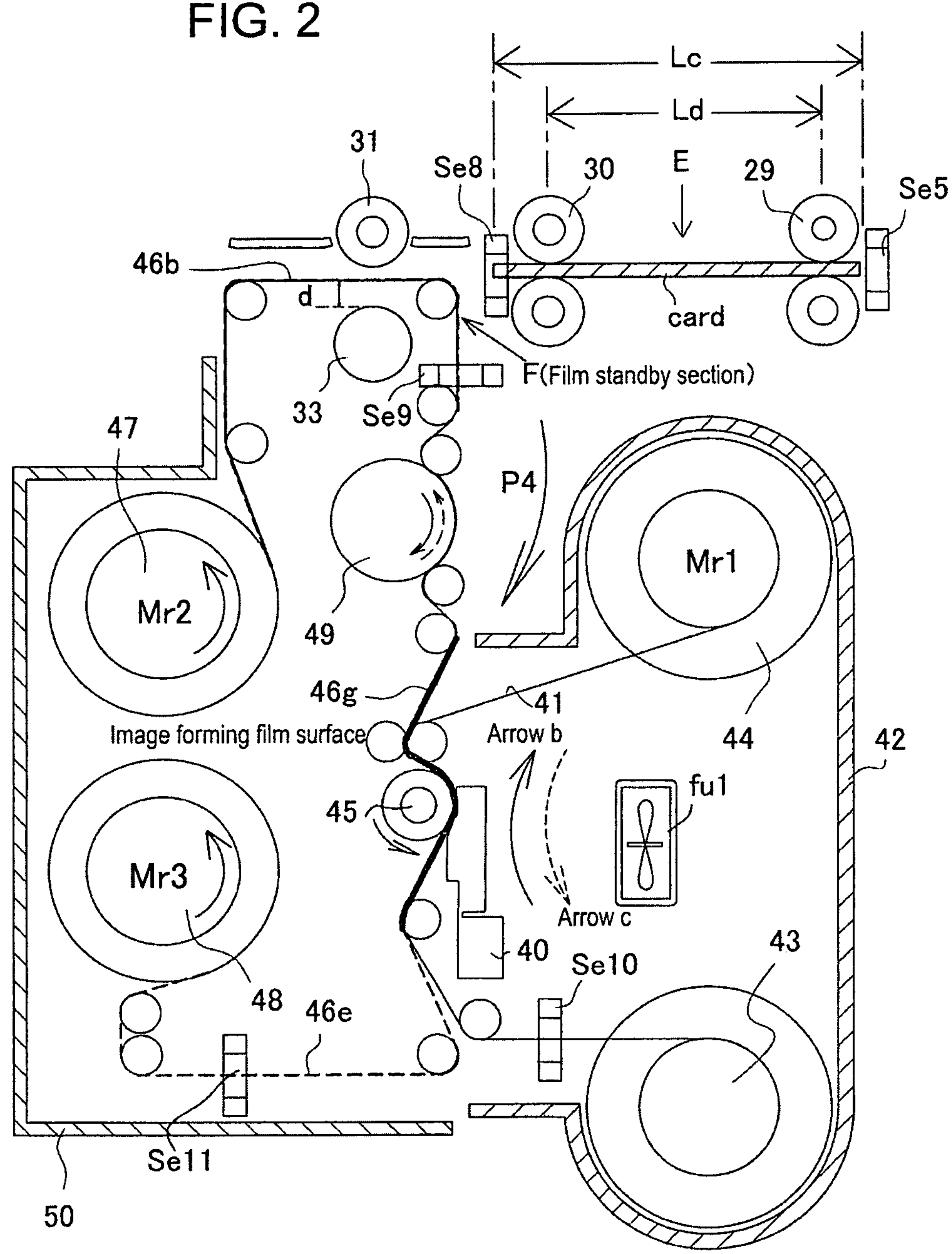
FIG. 2 is an explanatory view for explaining a state of the apparatus of FIG. 1 where a transfer film is fed to an image forming section to form an image.

The medium standby section E is disposed on the first conveying path P1 at a position on the upstream side of the transfer section B. As illustrated in FIG. 2, in the medium standby section E, the first and second roller pairs 29 and 30 are disposed at an interval smaller than a length of the card in a conveying direction. The card is made to stand by temporarily in a state of being held by the first and second roller pairs 29 and 30 arranged front and rear with a space therebetween. To this end, a transmission clutch (not illustrated) is provided between the first and second roller pairs 29, 30 and drive motor, and turning OFF the clutch allows the card to stop and stand by. The first and second roller pairs 29 and 30 are disposed between the reversing unit 20 and image transfer section B to be described later.

Further, a sensor Se8 for detecting a leading end of the card is mounted to the second roller pair 30 adjacent to the transfer platen 31 and detects the presence/absence of the card in the medium standby section E. The leading end of the card in a standby state is positioned on the upstream side of the heating roller 33 to be described later. This prevents the leading end portion of the card in the standby state from being heated by the heating roller 33, thus preventing unevenness from occurring in an image to be transferred onto the card.

By disposing the medium standby section E at a position between the reversing unit 20 and image transfer section B on the first conveying path P1 as described above, it is possible to separately control a job to be performed on the upstream side conveying path (jobs of recoding magnetic information on the second conveying path P2 and recording IC information on the third conveying path P3) and a job to be performed on the downstream side conveying path (job of forming an image on the first conveying path P1). The medium standby section E may be disposed on a path other than the first conveying path P1 and, in this case, the medium standby section E is preferably disposed on both the second and third conveying paths P2 and P3.

[Configuration of Image Transfer Section]

The image transfer section B is disposed on the first conveying path P1 at a position on the downstream side of the medium standby section E. As illustrated in FIG. 1, the image transfer section B is constituted by the transfer platen 31 (hereinafter, referred to as "platen 31") that backs up and supports the recording card. The heating roller 33 is disposed opposite to the platen 31. The heating roller 33 is moved up and down between a standby position (FIG. 2) spaced apart from the transfer platen 31 and an operating position (FIG. 5) at which it holds and presses the card with the transfer platen 31. Although not illustrated, this elevating mechanism is constituted by, e.g., a shift cam and a drive motor for rotating the shift cam.

The transfer film 46 is wound so as to travel between the transfer platen 31 and heating roller 33. The heating roller 33 is formed of a heat-resistant rubber material and presses and heats the recording card and transfer film 46 between itself and the transfer platen 31. The heating/pressing allows image ink formed on the transfer film 46 to be heat-welded onto the recording card.

To this end, at least one (in the illustrated example, the transfer roller side is driven) of the transfer platen 31 and heating roller 33 is driven, and a rotation speed of the driven roller is set so as to match a conveying speed (peripheral speed of the second roller pairs 30) of the recording card and a traveling speed (peripheral speed of a conveying roller 49 to be described later) of the transfer film.

The heating roller 33 has, inside a roll thereof, a heater and uses this heater to maintain a surface of the roller at a predetermined temperature. The heating roller 33 is supported by the apparatus frame so as to be movable between a position contacting the transfer platen 31 and a position spaced apart therefrom. As described above, the heating roller 33 is provided with the heater that increases the surface temperature to a predetermined value and an elevating mechanism (not illustrated) that moves up and down the roller.

The heating roller 33 is shifted from the standby state (separated position) to the operating state (pressure contact position) at timing when the leading end of the card delivered by the second roller pairs 30 reaches the transfer platen 31.

A reference symbol Se10 denotes a sensor for detecting a position of the ink ribbon 41, and a reference symbol Se9 denotes a sensor for detecting presence/absence of the transfer film 46. The image transfer section B has a fan fn2 for discharging heat generated in the apparatus to an outside atmosphere.

[Discharge Path]

A discharge path P5 for conveying the recording card to a housing stacker 60 is disposed on the downstream side of the image transfer section B. Conveying rollers (which may be realized by a belt) 37 and 38 are disposed on the discharge path P5 and connected to a not illustrated conveying motor. A decurl roller 36 is disposed between the conveying rollers 37 and 38 and presses a center of the card held between the conveying rollers 37 and 38 for curl correction.

[Configuration of Image Forming Section]

The image forming section D forms an image such as a face picture or text data on front and rear surfaces of the card. For example, the illustrated apparatus uses a sublimation ink ribbon to perform image formation. The image forming section D is provided with the thermal head 40 and ink ribbon 41. The ink ribbon 41 is housed in the ribbon cassette 42. A supply spool 43 and a winding spool 44 are housed in the ribbon cassette 42. The winding spool 44 is connected with a wind motor Mr1.

The thermal head 40 is disposed opposite to the image forming platen 45. The thermal head 40 is connected with a head control IC 74$x$ (FIG. 6) for heating control of the thermal head 40. The head control IC 74$x$ controls the heating of the thermal head based on image data to form an image on the transfer film 46 to be described later using the ink ribbon 41. To this end, the winding spool 41 is configured to be rotated in sync with the heating control of the thermal head 40 to wind up the ink ribbon 41 at a predetermined speed. A reference symbol fn1 denotes a cooling fan for cooling the thermal head 40.

The transfer film 46 is wound around the supply spool 47 and winding spool 48. The transfer film 46 is wound so as to convey a transferred image to the transfer roller 31 and heating roller 33. A reference numeral 49 denotes a conveying roller for conveying the transfer film 46. Pinch rollers 32$a$ and 32$b$ are disposed on a peripheral surface of the conveying roller 49. The conveying roller 49 is connected with a not illustrated drive motor. The transfer film 46 is moved in a counterclockwise direction in FIG. 1 at the same speed as that of the ink ribbon 41.

[Housing Section]

As illustrated in FIG. 1, a housing section G is configured to house the card fed from the image transfer section B in the housing stacker 60. The housing stacker 60 detects a topmost card using a not illustrated elevating mechanism 61 and a level sensor and is configured to be moved downward in FIG. 1 by the elevating mechanism 61.

[Configuration of Film Cassette]

The film cassette 50 mounting therein the above-described transfer film 46 will be described. As illustrated in FIG. 1, the film cassette 50 is constituted by a unit separated from the apparatus housing 2 and is detachably attached to the apparatus housing 2. Although not illustrated, a front cover is openably disposed at a front side of the film cassette 50 in FIG. 1. The film cassette 50 is attached to the apparatus frame in a state where the front cover is opened.

As illustrated in FIG. 2, the supply spool 47 and winding spool 48 are rotatably mounted in the film cassette 50, and the transfer film 46 is bridged between both the spools. The winding spool 48 is connected with a winding motor Mr3, and the supply spool 47 is connected with an unwinding motor Mr2. The motors Mr2 and Mr3 are each mounted to the apparatus frame and connected to a spool shaft through a coupling member. The both motors Mr2 and Mr3 are stepping motors and rotated in the same direction by the same feeding amount.

The transfer film 46 is wound in a roll around the supply spool 47 with a marker formed at predetermined intervals. The film conveying path P4 is formed between the supply spool 47 and winding spool 48. The transfer film 46 is engaged with and guided by the conveying roller 49 and pinch rollers 32*a*, 32*b* which are disposed on the apparatus side so as to be able to travel along the film conveying path P4. The conveying roller 49 is connected to the drive motor so as to allow the film to travel at a uniform speed.

A film standby section F is disposed on the film conveying path P4 at a position on the upstream side of the image transfer section B and configured such that the transfer film 46 is made to stand by in a temporarily stopped state at the standby section F. The film standby section F and above-described medium standby section E are disposed at the same distance from the downstream side image transfer section B. This is because the recording card and transfer film 46 made to standby at the both standby sections with leading ends thereof aligned with predetermined positions of the standby sections need to be delivered toward the image transfer section B at the same timing.

The film conveying path P4 is configured such that the transfer film 46 housed in the film cassette 50 travels between the transfer platen 31 and image forming section D. The image forming section D is disposed below the first conveying path P1 at a position corresponding to an arrangement space of the medium standby section E of the first conveying path P1. The image forming section D is constituted by the image forming platen 45 and thermal head 40 disposed opposite to the platen, and the ink ribbon 41 travels between the image forming platen 45 and thermal head 40. A configuration of the ink ribbon 41 will be described later together with a configuration of a ribbon cassette 42.

[Configuration of Ribbon Cassette]

The ribbon cassette 42 set in the apparatus illustrated in FIG. 1 will be described. As illustrated in FIG. 1, a supply spool 43 and a winding spool 44 are rotatably incorporated in the ribbon cassette. A film-like ribbon ink 41 is wound between the both spools 43 and 44. The ink ribbon 41 is, e.g., a sublimation ribbon on a surface of which four colors of Y (yellow), M (magenta), C (cyan), and B (black) are sequentially arranged in a band-like manner. The thus configured ink ribbon 41 is wound in a roll around the supply spool 43.

The ribbon cassette 42 is detachably attached to the apparatus housing in a near-far direction of a paper surface of FIG. 1, and the ink ribbon 41 is inserted between the image forming platen (platen roller) 45 and thermal head 40 which are mounted on the apparatus housing 2 side. The winding spool 44 is engaged with the wind motor Mr1 mounted on the apparatus housing 2 side through a coupling (not illustrated).

As illustrated in FIG. 1, in the ribbon cassette, the spools 43 and 44 are disposed along an extending direction of the second conveying path P2, i.e., in the vertical direction. Similarly, in the film cassette 50, the supply spool 48 and winding spool 47 are disposed in the same direction as the spools 43 and 44, i.e., in the vertical direction. By disposing the spools 43, 44 of the ribbon cassette 42 and spools 47, 48 of the film cassette 50 in substantially the same direction as the extending direction of the second conveying path P2 as described above, component arrangement density in the apparatus can be improved.

[Control Configuration]

A control configuration of the apparatus of FIG. 1 will be described based on FIG. 6. A controller H is constituted by, e.g., a control CPU 70. The control CPU 70 is provided with a ROM 71 and a RAM 72. The control CPU 70 functionally includes a data input control section 73, an image forming control section 74, a film conveying control section 75, and a card conveying control section 77. That is, the control CPU 70 is configured to perform data input control, image formation control, film conveying control, and card conveying control by executing a control program stored in the ROM 71.

The card conveying control section 77 transmits a command signal to a drive circuit of a not illustrated drive motor so as to control a card conveying unit (first and second roller pairs 29 and 30) disposed on the first conveying path P1 and discharge path P5. The card conveying control section 77 transmits the command signal to a drive circuit of the turning motor of the reversing unit 20.

The card conveying control section 77 is electrically connected to sensors Se1 to Se8 and Se12 so as to receive a state signal from each of the sensors. In addition, the card conveying control section 77 is connected to the data input control section 73 so as to receive a job signal therefrom. The card conveying control section 77 sets the leading end of the card to be set at the medium standby section E of the medium conveying paths (conveying paths P1 to P3) of the recording medium to a cueing position (print start line).

The data input control section 73 is configured to transmit a command signal for controlling transmission/reception of input data to an IC 73*x* for data R/W incorporated in the magnetic recording section and to transmit a command signal for controlling transmission/reception of input data to an IC 73*y* for data R/W incorporated in the IC recording section. The image forming control section 74 controls the thermal head 40 that forms an image on the transfer film 46 with the ink ribbon 41 at the image forming section D and ribbon feeding (wind motor Mr1). The RAM 72 stores data required for control of the above operations and film conveying control to be described later in the form of, e.g., a data table.

[Information Recording Operation]

The control CPU 70 records magnetic/IC information and image information in the recording medium (card) according to an operation control program stored in the ROM 71. The recording operation to be executed will be described based on FIG. 7. It should be noted that an operation procedure is not limited to an illustrated one and set in accordance with a specification and a usage of the apparatus.

The magnetic/IC information and image information to be recorded in the card are set in an external controller (computer, etc.). The control CPU 70 executes recording of the information, such as "combination of magnetic information and image information", "combination of IC information and image information", and "combination of magnetic IC information and image information" set in the external controller.

The control CPU 70 (hereinafter, referred to as "controller") receives a job start signal (StA1). Upon reception of the job start signal, the controller delivers the card from the medium supply section C toward an inside of the apparatus body (StA2). An inlet sensor Se1 detects a leading end of the card supplied to the inside of the apparatus body (StA3). Upon detection of entering of the card by the inlet sensor Se1, the controller controls the reversing unit 20 to feed the card to the conveying path (one of the first to third conveying paths) specified by an external apparatus (StA4).

In parallel to the above feeding of the card to the recording section, the controller delivers the transfer film 46 to the image forming section D (StA5). The film delivery is performed based on rotation control of the unwinding motor Mr2 and winding motor Mr3, and a film sensor Se9 is used to detect the delivery amount. Then, the controller executes IC information data transfer (StA6) and image information data transfer (StA7). A time required for the data transfer changes depending on data volume or a state of a transfer unit and, thus, other following operations to be processed in parallel to the data transfer may precede the data transfer.

After completion of acquisition of magnetic/IC information and feeding of the card to the recording section, the controller records the magnetic/IC information in the card (StA8). The recording of the magnetic IC information is executed by the magnetic R/W unit 24 and IC R/W unit 23. When an error is found in the recorded information, the card is discharged to the eject stacker 25. When the read/write error for the card occurs, the controller delivers the next card (blank card) from the medium supply section C.

Then, the controller sets a head temperature of the thermal head 40 to an appropriate value at a stage where the transfer film 46 is delivered to the image forming section D (StA9). In this temperature setting, the head is cooled when the head temperature is excessively high and is heated when having a low temperature. It requires more time for cooling the head, so that the controller makes the transfer film 46 to standby until the head temperature is set to an appropriate value. The film is made to standby according to a method described in a first or second embodiment to be described later or a method achieving the same effect.

The controller executes image formation after waiting for the setting of the head temperature (StA11). In this image formation, an ink image or a transfer image is formed on the transfer film based on image data. The illustrated apparatus adopts a sublimation thermal print method and performs the image transfer (primary transfer) using an ink ribbon (YMCK film).

After the completion of the above image forming, the controller moves the transfer film 46 to the film standby section F (StA12). This film movement is performed based on rotation of the unwinding motor Mr2 and winding motor Mr3 and marker detection. In this state, the card and film stand by at the medium standby section E (StA10) and film standby section F, respectively, with the leading ends thereof set to a cueing position.

At a stage where the card and transfer film 46 stand by the standby sections E and F, respectively, the controller determines whether or not the heating roller 33 is at an appropriate temperature (StA13). When one of the card and transfer film 46 does not reach its corresponding standby section (E or F) and when the heating roller 33 is not at the appropriate value, the controller waits until the above conditions are satisfied.

Figure 3:
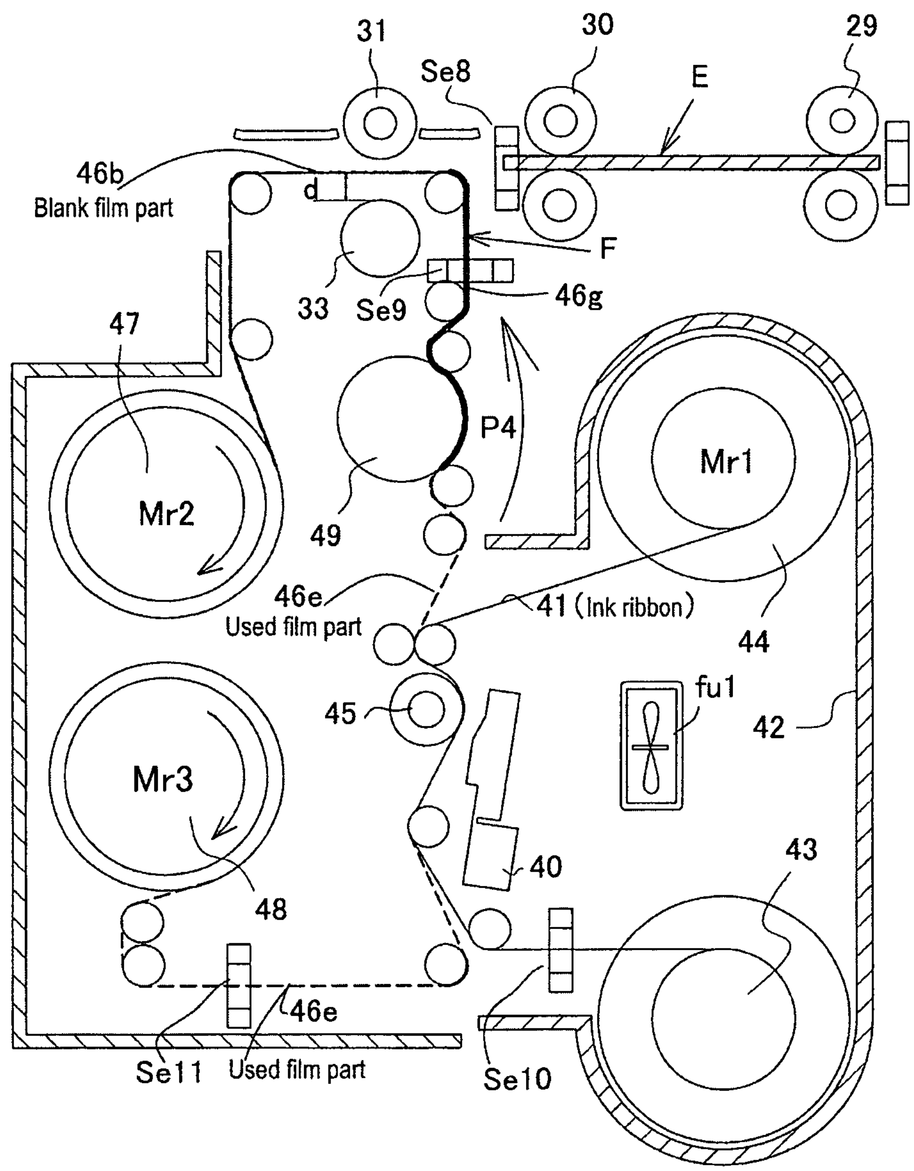
FIG. 3 is an explanatory view for explaining a state of the apparatus of FIG. 1 where the transfer film on which the image has been formed is made to stand by at a standby section.

Then, the controller delivers the card and transfer film 46 from the standby sections E and F toward the image transfer section B when the heating roller reaches the appropriate temperature. The card and transfer film 46 are delivered at the same timing and at the same speed so as to allow the card and transfer film 46 to reach the image transfer section B (StA14). Then, at timing when the card and film reach the transfer platen 31, the controller moves up the heating roller 33 positioned at its standby position spaced apart from the transfer platen to a pressure contact position with the platen (St15). The standby state is illustrated in FIG. 3, and transfer state is illustrated in FIG. 5.

Figure 5:
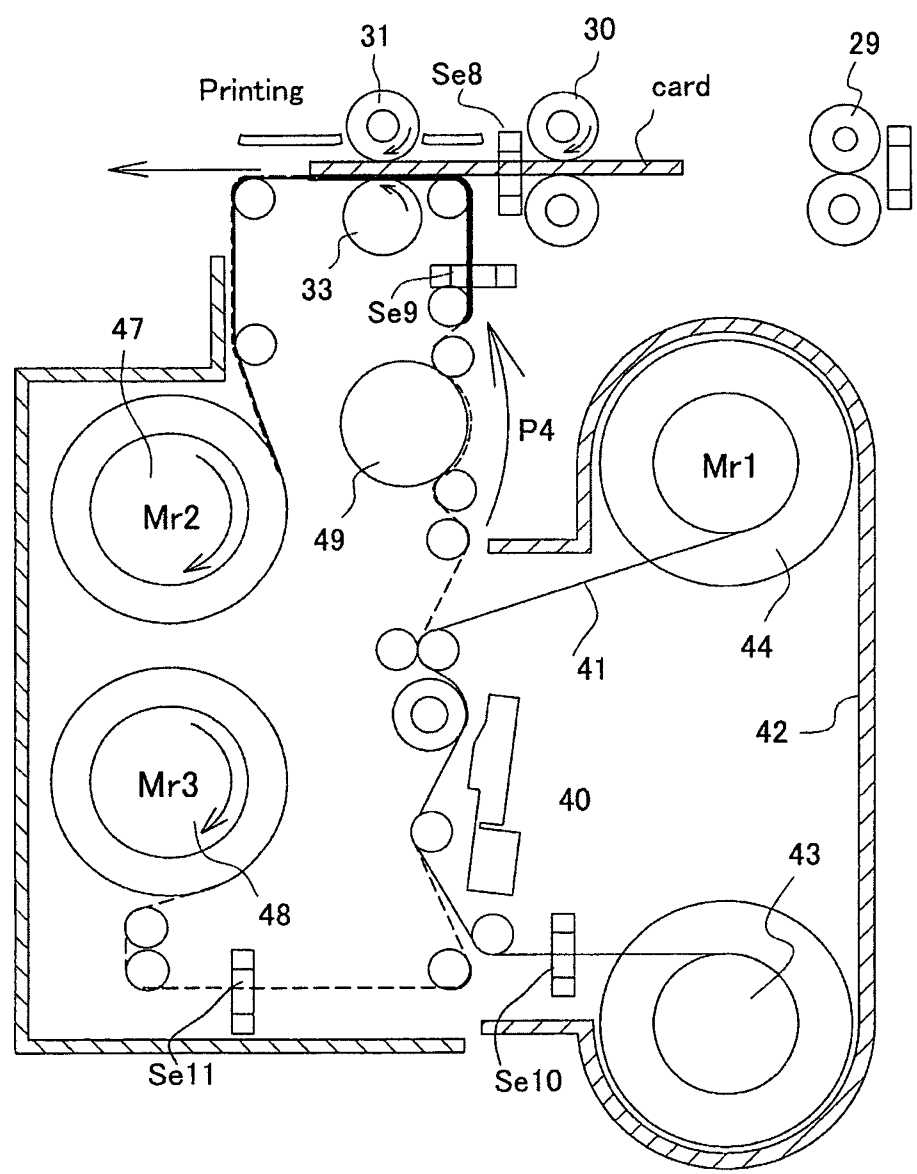
FIG. 5 is an explanatory view for explaining a state of the apparatus of FIG. 1 where the image on the transfer film is transferred onto a recording medium.

When the card leading end and transfer film 46 are moved simultaneously in the state illustrated in FIG. 5, the image on the transfer film is transferred onto the card by heating and pressing (secondary transfer; StA16). Then, the controller discharges the card and rewinds the transfer film 46 (StA17).

[Configuration of Determination Unit]

The present invention is featured in having a determination unit 76 to be described below so as to prevent the transfer film 46 from being exposed to the heating roller 33 for a long time in the course of the above information recording operation. The control CPU 70 is provided with a film conveying control section 75, which performs delivery control of feeding the transfer film 46 from the supply spool 47 to the image transfer section B and film standby control of making the delivered film to stand by temporarily. To this end, the control CPU 70 is connected to driver circuits of the unwinding motor Mr2 and winding motor Mr3 of the film cassette 50 so as to control the motors Mr3 and Mr2.

In the film delivery control, the film is delivered from the film supply section (supply spool 47) to the image forming section D (image forming platen 45) according to an operation program of the control CPU 70. This film supply to the image forming section D is performed based on rotation control of the motors Mr2 and Mr3 connected respectively to the supply spool 47 and winding spool 48. In addition, a marker is formed on the transfer film 46 for each image forming area (i.e., for each frame), and the marker is detected using the sensors Se9 and Se11 for control of the delivery amount of the film (see FIGS. 2 and 3).

In the course of feeding the transfer film 46 from the supply section (supply spool) 47 to the image transfer section, the film needs to be temporarily stopped and made to stand by. To this end, the film conveying control section 75 is provided with the determination unit 76.

Causes for making the transfer film 46 stand by in the operation course of the apparatus will be described. The first reason is "the transfer film 46 and recording medium (card) are made to stand by in a stopped state on the upstream side of the image transfer section B". The transfer film 46 and card are made to stand by on the upstream side of the image transfer section B (transfer platen 31), more specifically, at the film standby section F and medium standby section B, respectively, in a stopped state so as to allow the transfer film 46 and card to be fed to the image transfer section B simultaneously. Then, the transfer film 46 and card are fed toward the image transfer section B at the same time and at the same speed from the both standby sections F and E to reduce displacement between the leading ends of the transfer film 46 and card with respect to the cueing position (print start line).

The second reason is that there may be a case where "the transfer film 46 are made to stand by temporarily at the image forming section D". More specifically, there may be a case where the transfer film 46 delivered from the supply section (supply spool) 47 is made to stand by at the image forming section D until completion of warm-up of the image forming mechanism. For example, when the illustrated thermal head 40 is adopted as the image forming mechanism, it is necessary to make the transfer film 46 stand by at the image forming section D until the head temperature reaches a predetermined temperature (including a case where the excessively high temperature is to be decreased).

Further, when much time is required to transfer the image data from an external apparatus to the image forming mechanism, the film needs to be made to stand by at the image forming section D. When the transfer film 46 fed to the image forming section D is made to stand by temporarily, a blank part (unused surface) 46*b* of the film faces the heating roller 33 in the illustrated apparatus configuration (in which an image transfer direction and delivery direction of the transfer film 46 are opposed to each other). The blank part 46*b* and a surface of the heating roller face each other with a distance of d between them.

The third reason is that there may be a case where "the transfer film in a standby state at the film standby section F is made to stand by for a predetermined time period or more".

This occurs when the heating roller is not at an appropriate temperature. When the heating roller 33 is not at the appropriate temperature at timing when the film is fed from the film standby section F to the transfer section B, the transfer film is made to stand by until the temperature of the heating roller 33 reaches the appropriate temperature (including a case where the excessively high temperature is to be decreased).

The fourth reason is that there may be a case where "when an apparatus error occurs, the transfer film 46 is stopped at the position at this time point (kept in a state at the occurrence of the error". When an apparatus error, for example, a read/write error with respect to the card occurs in the information recording section, the card is discharged outside the apparatus through an eject port, and a next card is supplied from the medium supply section. In such a case, the transfer film stands by at the position (image forming section or film standby section) for a long time.

The present invention solves a problem that the film is warped or a coating layer on the film surface is altered due to long time exposure of the transfer film 46 to the heating roller 33. To this end, the film conveying control section 75 is provided with the determination unit 76 to be described below.

Figure 6:
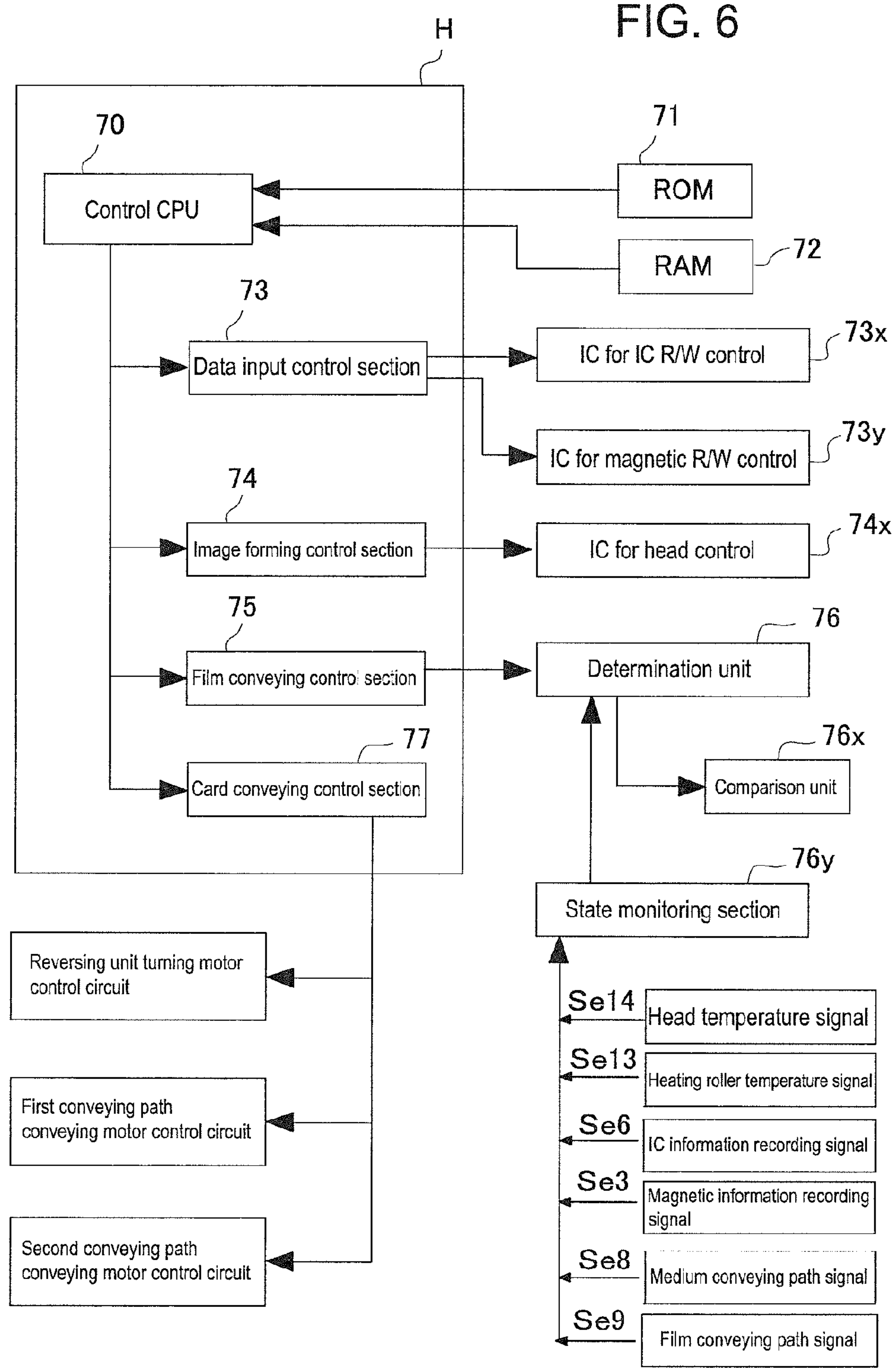
FIG. 6 is a block diagram illustrating a control configuration of the apparatus of FIG. 1.

In the control configuration illustrated in FIG. 6, the determination unit 76 (constitute by the control CPU) is connected with the standby section sensor Se9 of the film conveying path P4 and standby section sensor Se8 of the medium conveying path so as to receive a state signal (presence/absence of card or film) therefrom (see FIG. 6). In addition, the determination unit 76 is connected with a film sensor Se11 of the image forming section D, a temperature sensor Se13 (not illustrated) of the heating roller 33, and a temperature sensor Se14 of the thermal head are connected to the determination unit 76 so as to detect a state of the film in the image forming section D, a state of the heating roller, and a state of the thermal head.

The determination unit 76 moves "the film surface such that the same portion of the transfer film does not continue to be exposed to the heating roller (hereinafter, referred to as heating member) for a predetermined time period or more". That is, the determination unit 76 controls the unwinding motor Mr2 and winding motor Mr3 so as to change a part on the film that faces the heating member. The control to be performed in the determination unit 76 will be described based on first and second embodiments.

First Embodiment of Determination Unit

A first embodiment of the determination unit will be described based on FIG. 8. This embodiment monitors the causes (the above-described reasons 1 to 4) of the long time standby of the transfer film 46 and, when there occurs a need of the long time standby in a monitoring routine (when any of the above causes occur), moves the transfer film such that a different part from an initial feeding part faces the heating roller 33. When the cause of the long time standby is eliminated after the movement of the film, the transfer film 46 is returned to the initial feeding state.

The controller 70 detects a temperature state of the thermal head 40 at timing when the film sensor Se9 detects film delivery (FIG. 8, St02). Further, the controller 70 detects a temperature state of the heating roller 33 at timing when the film sensor Se9 detects that the transfer film that has been subjected to image formation is fed to the standby section F. Then, detected values of the temperature sensor Se14 of the thermal head and temperature sensor Se13 of the heating roller are compared with reference values stored in the RAM 72 (FIG. 8, St03).

Then, when "the detection value is not an appropriate value", the determination unit 46 determines that the cause of the long time standby occurs and moves the transfer film from the initial feeding state. In this case, the initial feeding part refers to a part of the transfer film that faces the heating roller 33 by initial feeding operation (prescribed feeding operation) of the transfer film. The above movement of the transfer film is performed based on any of the following first to third methods (St05).

For example, in the case of the second reason, when the temperature of the thermal head 40 is excessively high, it is waited until the thermal head 40 is cooled down to an appropriate value. At the same time, the transfer film 46 is moved such that a different part from the initial feeding part faces the heating roller 33.

Then, the film is made to standby in this state (St06). When the state values reach their appropriate values (St07), the film is wound back such that the initial feeding part faces the heating roller (St08). Then, subsequent operation is executed (St09).

As described above, a routine (software execution routine) that monitors whether or not the state values (head temperature and heating roller temperature, but not limited thereto) reach their appropriate values enables control such that the same part of the transfer film does not face the heating roller for a predetermined time period or more. A detailed control of the first embodiment will be described later based on FIG. 9 (head temperature control) and FIG. 10 (heating roller temperature control).

Second Embodiment of Determination Unit

A reference time ST is previously set in the determination unit 76. The reference time ST is set to a time period during which the film surface is not warped or altered due to heat in a state where the heating roller 33 and transfer film 46 are positioned at a predetermined distance (distance d in FIG. 2). The reference time is stored in the ROM 72.

The determination unit 76 is provided with a calculation unit for calculating a standby time WT (St55). When the standby time WT is more than the reference time ST (WT>ST) (St56), the transfer film is moved such that a different part from the initial feeding part faces the heating roller 33 (St58).

When, for example, the temperature of the thermal head 40 differs from the appropriate value by ΔT degrees, the calculation unit calculating the standby time WT calculates a time required to correct the temperature to the appropriate value based on a conversion table of "temperature difference VS required time". The conversion table is previously calculated and stored in the ROM 72.

As described above, by preparing a correlation table of the head temperature of the thermal head, roller temperature of the heating roller, data amount of a magnetic recording unit and IC recording unit and read/write time, it is possible to calculate "standby time" of the transfer film. Then, the calculated standby time and reference time are compared with each other and, when the standby time is more than the reference time (WT>ST), the part of the transfer film that faces the heating roller 33 is changed.

When the calculated "standby time" is passed (timer up), the film is wound back such that the initial feeding part faces the heating roller (St60), followed by the transfer operation (St61).

[Retreating Movement of Transfer Film]

The following describes an embodiment of the movement of the transfer film 46 to be performed by the determination unit 76 in the above first and second embodiments. In a first method, the film is moved such that the part of the transfer film that faces the heating roller 33 is changed from the initial feeding part (unused blank part in FIG. 1) to a used film part.

FIG. 2 illustrates a state where the transfer film 46 is fed to the image forming section D. In FIG. 2, the film part 46*b* that faces the heating roller 33 is an unused blank part. FIG. 3 illustrates a state where the transfer film 46 that has been subjected to image formation is made to standby at the film standby section F. In this state, the film part 46*b* that faces the heating roller 33 is the unused blank part.

Figure 4:
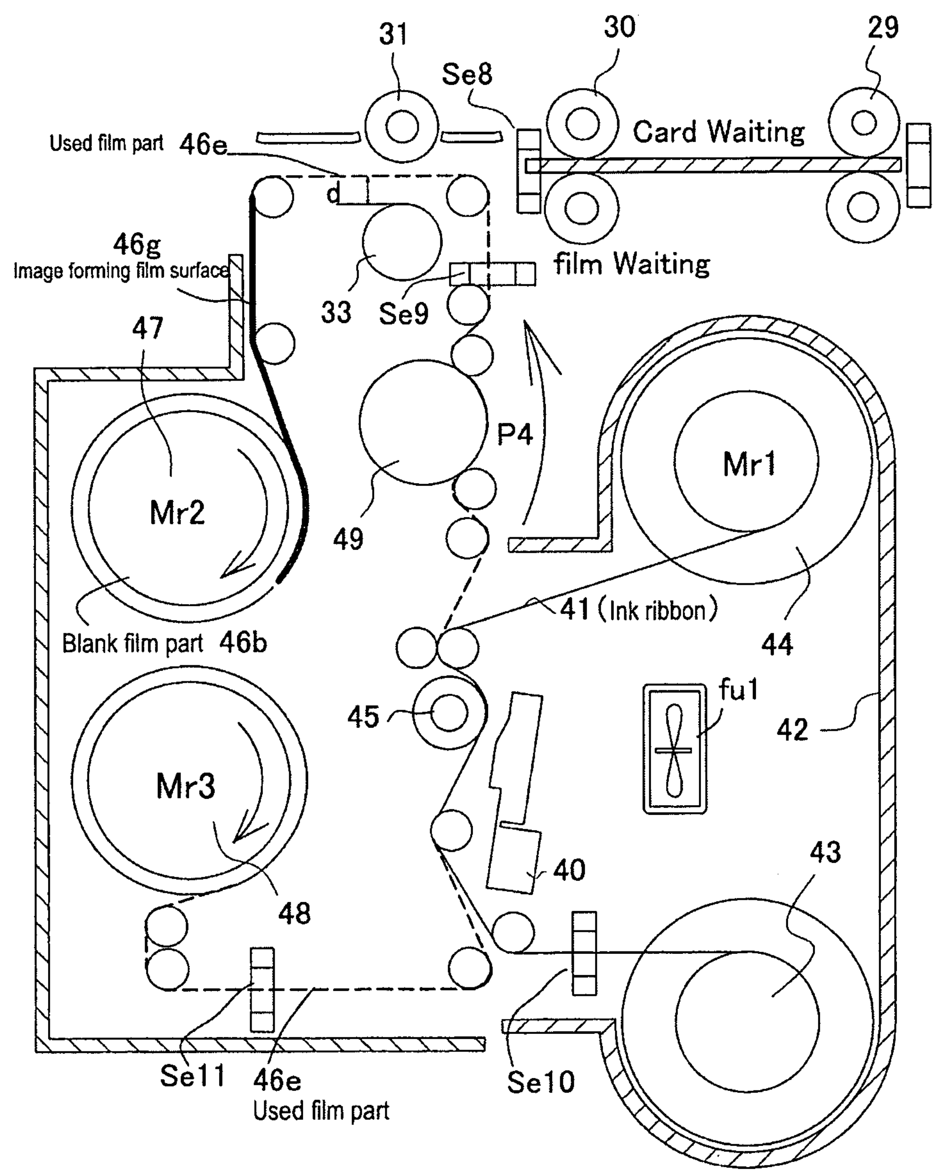
FIG. 4 is an explanatory view for explaining a state of the apparatus of FIG. 1 where a used surface of the transfer film is made to face a heating member.

Then, the film is moved from a state illustrated in FIGS. 2 and 3 where the film part that faces the heating roller 33 is the unused blank part 46*b* to a state illustrated in FIG. 4. In FIG. 4, the blank part 46*b* and image forming part 46*g* are wound back by the supply spool 47 such that the film part that faces the heating roller 33 is a used part 46*e*. In this state, if the film surface is altered due to heat from the heating roller 33, image formation is not adversely affected.

A second method of moving the transfer film is a method that "a different part from the initial delivery part is made to face the heating roller 33". Although not illustrated, the supply spool 47 and winding spool 48 are rotated in a predetermined direction to feed the transfer film in a delivery direction or a direction opposite to the delivery direction. This prevents the same part from facing the heating roller 33 for a long time, thereby reducing alteration and deformation due to heat.

A third method of moving the transfer film is a method that "the initial feeding part that faces the heating roller is gradually moved". Although not illustrated, the spools 47 and 48 are rotated at low speed or intermittently. This prevents the alternation and deformation of the film surface as in the above method.

[Concrete Control Configuration of Determination Unit]

Figure 9:
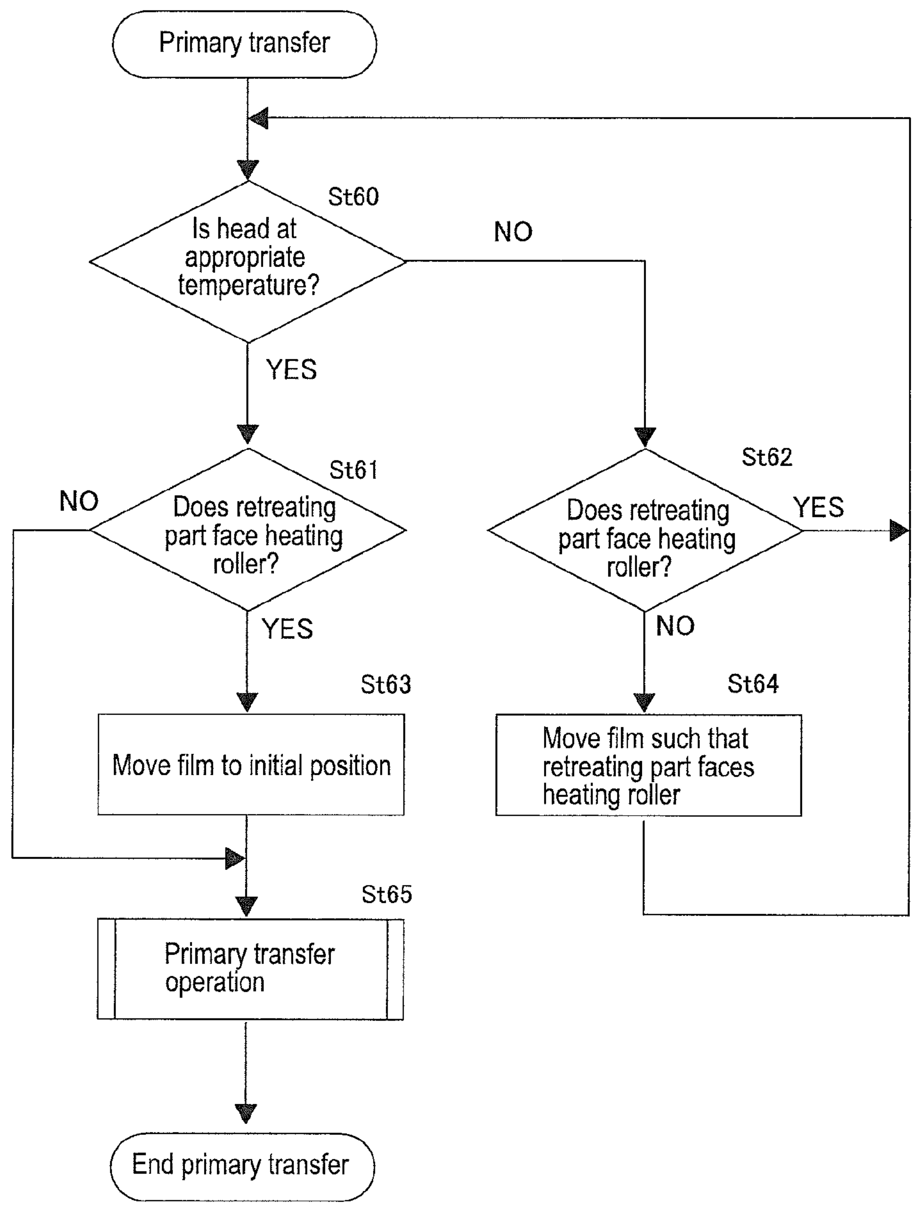
FIG. 9 is a flowchart illustrating an operation state of image formation on the transfer film in the control configuration of FIG. 8.

The following describes a concrete configuration of the determination unit 76. FIG. 9 is a flowchart of the control operation for the image forming section D. The control CPU 70 feeds the transfer film 46 to the image forming section D. Position control of the film part is executed based on the film feeding signal.

The determination unit 76 determines whether or not the head is at an appropriate temperature (St60). When the head is not at the appropriate temperature, the determination unit 76 determines whether or not a film part that faces the heating roller 33 is a retreating part (St62). When the film part that faces the heating roller 33 is the retreating part, the determination unit 76 executes (continues) a monitoring routine of monitoring whether or not the head is at an appropriate temperature. When the film part that faces the heating roller 33 is not the retreating part, the transfer film is moved such that the retreating part faces the heating roller 33. That is, the transfer film is moved such that a part of the transfer film other than the initial delivery part faces the heating roller 33. Thus, one of the above-described transfer film moving methods is executed.

When the head is at an appropriate temperature (St60), the determination unit 76 determines whether or not a film part that faces the heating roller 33 is the retreating part (St61). When the film part that faces the heating roller 33 is the retreating part, the transfer film is moved such that the initial delivery part faces the heating roller 33 (St63). After this movement, or when the film part that faces the heating roller 33 is not the retreating part, image formation (primary transfer) is executed (St65).

Figure 10:
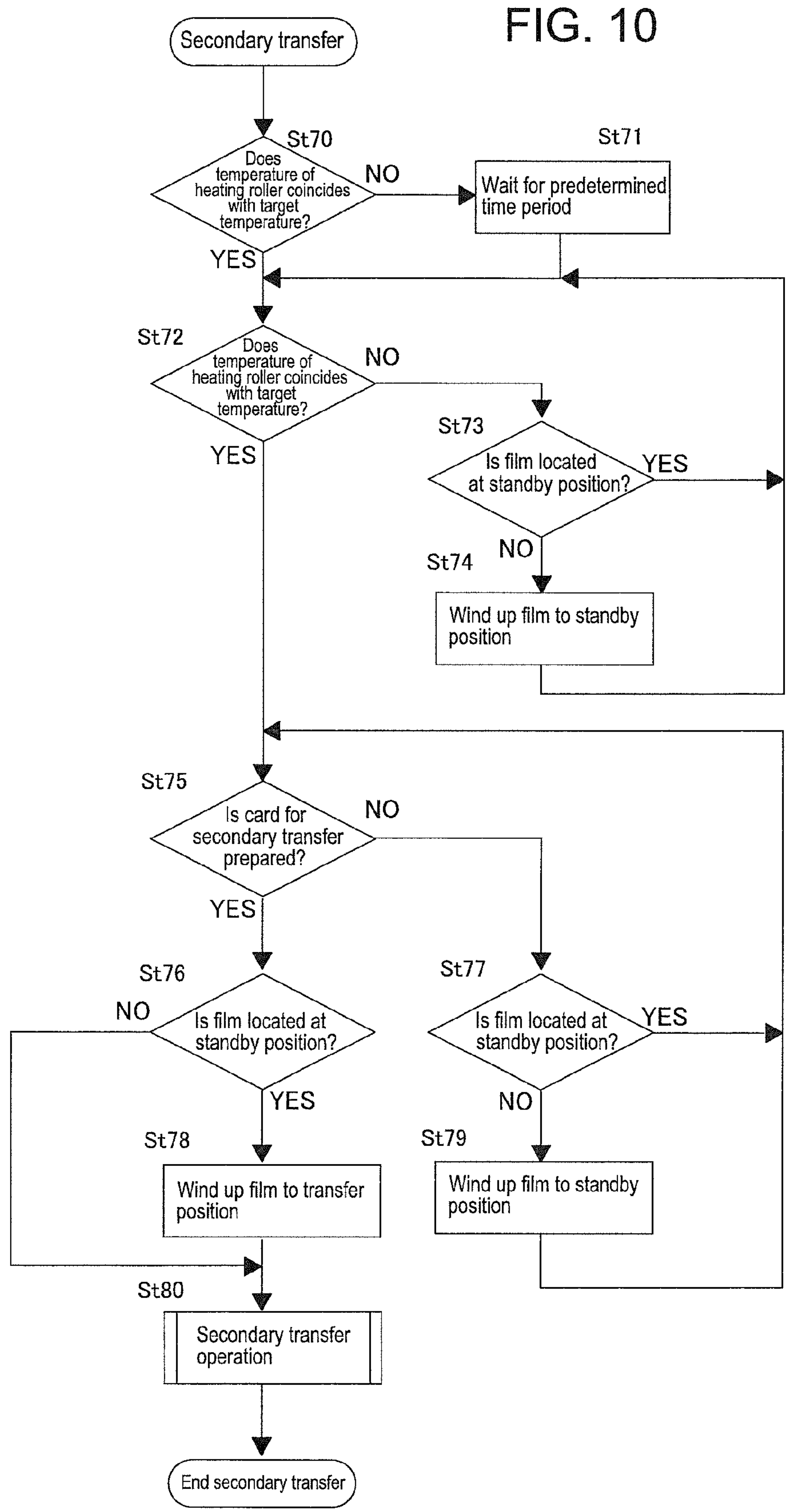
FIG. 10 is a flowchart illustrating an operation state of image transfer from the transfer film onto a card in the control configuration of FIG. 8.
Figure 11:
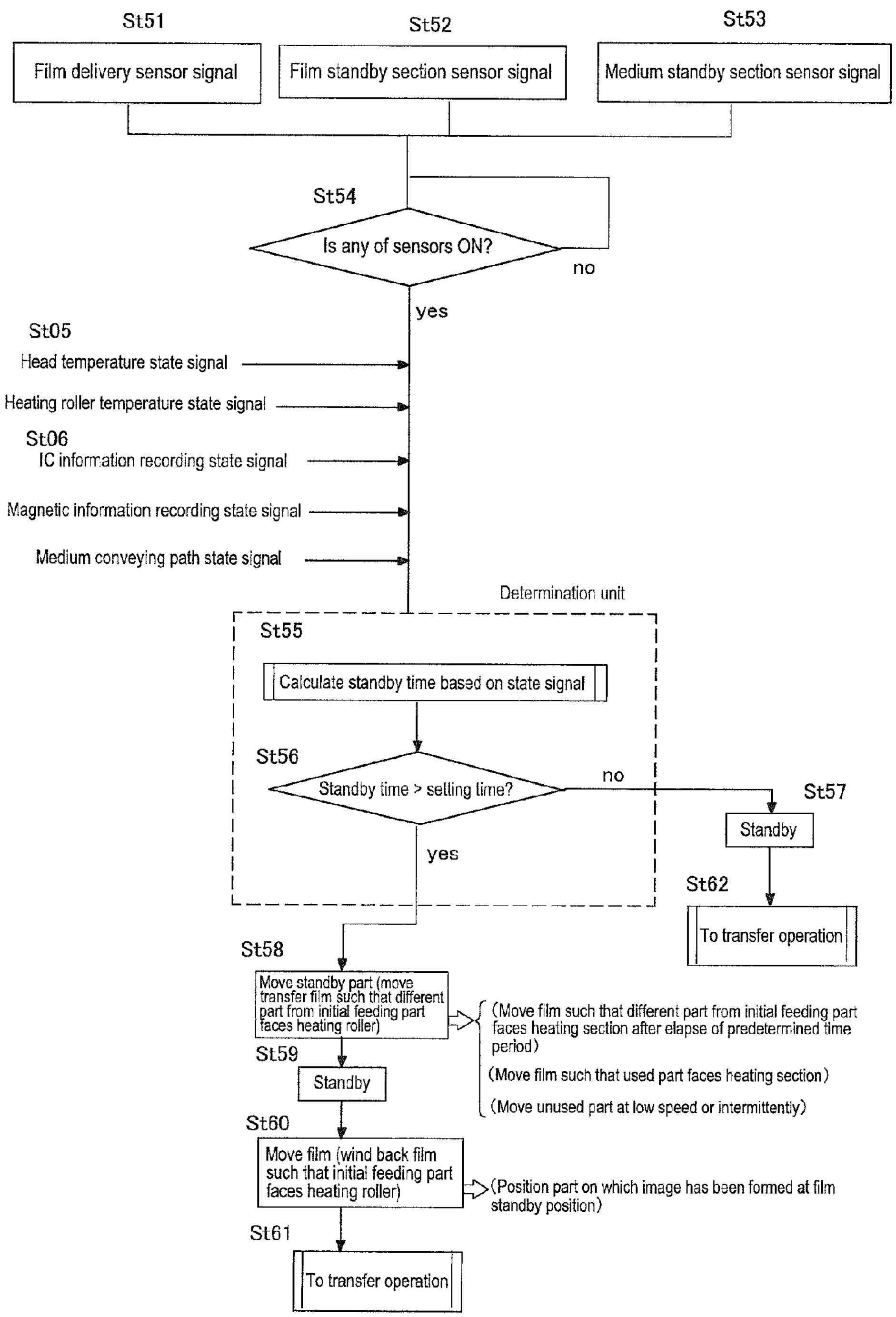
FIG. 11 is an explanatory view illustrating another configuration (second embodiment) of the control configuration of the transfer film feeding mechanism in the present invention.

The following describes the image transfer operation in the first embodiment of the determination unit based on FIG. 10. The determination unit 76 of the controller 70 determines whether or not the temperature of the heating roller 33 coincides with a target value (St70). When the temperature of the heating roller 33 does not coincide with the target value, it is waited until a predetermined time period (e.g., two seconds) elapses (St71). After elapse of the predetermined time period, the determination unit 76 determines whether or not the temperature of the heating roller reaches the target value (St72). When the temperature of the heating roller does not reach the target value, the determination unit 76 determines whether or not the retreating part faces the heating roller 33 (St73). When the retreating part faces the heating roller 33, the determination unit 76 executes a monitoring routine of monitoring whether or not the temperature of the heating roller coincides with the target value. When the retreating part does not face the heating roller 33, the film is moved such that the retreating part faces the heating roller 33.

Then, the determination unit 76 determines whether or not the card is located at the standby position E (St75). When the card is not located at the standby position E, the determination unit 76 determines whether or not the film is located at the standby position F (St77). When the film is located at the standby position, it is waited until the card reaches the standby position E (St75).

When the card and film are prepared at the standby position E and standby position F, respectively (St76), the film is moved to the transfer position B and, at the same time, the card is moved to the transfer position. Through this operation, an image on the film is transferred onto the card, that is, the secondary transfer operation is executed (St80).

The above print apparatus can prevent the transfer film 46 from being adversely affected by heat. The following describes a printing method of the printing apparatus along a flowchart of FIG. 12.

Figure 12:
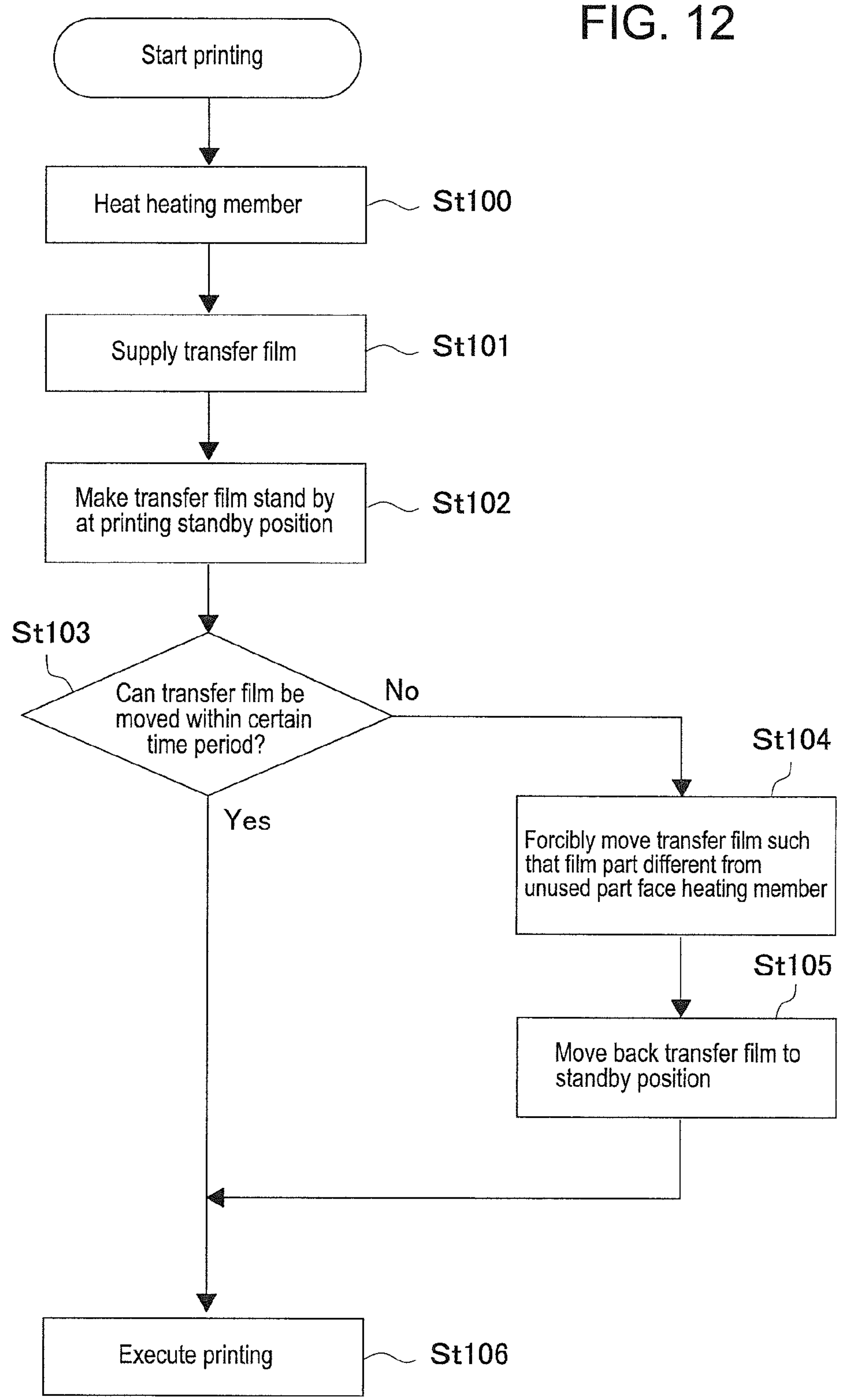
FIG. 12 is a flowchart illustrating a printing method in the present invention capable of preventing the transfer film from being adversely affected by heat.

Referring to FIG. 12, when the printing operation is stared in the image transfer section B or image forming section D, the heating member is heated by being energized in step St100, and the transfer film 46 is supplied in step St101. Then, in step St102, the transfer film 46 is made to standby with the unused part of the transfer film 46 positioned between the heating roller and transfer platen. In this state, the transfer film 46 is set at a printing standby position.

In step St103, when the transfer film 46 is at the standby position, it is determined whether or not the unused part of the transfer film 46 in a state of being stopped for a certain time period between the heating member and transfer platen can be moved for subsequent processing.

In step St103, when it is determined that the transfer film 46 cannot be moved for subsequent processing even after elapse of the certain time period, a processing flow proceeds to step St104, where the transfer film 46 is forcibly moved such that a different film part of the transfer film 46 faces the heating member. This can prevent the unused part of the transfer film 46 from being adversely affected by heat.

Thereafter, when a cause that prevents the transfer film 46 from being moved for subsequent processing even after elapse of the certain time period is eliminated, the transfer film is moved back to the printing standby position in step St105, and printing is executed in step St106. That is, the transfer operation of an image from the transfer film 46 to the recording medium at the image transfer section B or image forming operation on the transfer film 46 at the image forming section D is performed.

Further, when it is determined in step St103 that the transfer film 46 can be moved for subsequent processing within a certain time period, the processing flow directly proceeds to step St106.

A flowchart of FIG. 13 concretely illustrates operation that prevents the transfer film 46 from being adversely affected at the image transfer section B. Referring to FIG. 13, when the printing operation is started, the heating roller 33 as the heating member is heated by being energized in step St110. Then, in step Still, supply operation of the transfer film 46 is performed to feed the transfer film 46.

Thereafter, in step St112, the image forming operation on the transfer film 46 at the image forming section D is performed. After the image forming operation, the transfer film is fed to the film standby section F which is the printing standby position. Then, the transfer film 46 that has reached the film standby section F is made to stand by in step St113. In this state, the unused part of the transfer film 46 is positioned between the heating roller 33 and transfer platen 31.

In step St114, it is determined whether the unused part of the transfer film 46 in a state of being stopped for a certain time period between the heating roller 33 and transfer platen 31 can be moved for subsequent transfer processing of transferring an image onto the card as the recording medium. In the flowchart of FIG. 13, this determination is made by detecting whether or not the card is positioned at the medium standby section E at this time. In this case, presence/absence of the card is detected at a stage where the transfer film 46 reaches the film standby section F and, when the card does not exist at the medium standby section, the presence/absence of the card is detected once again after elapse of a certain time period (e.g., two seconds).

When it is detected in step St114 that the card as the recording medium does not exist at the medium standby section 5, it is determined that the card is being processed in a Preceding process and thus the transfer film 46 cannot be moved after elapse of the certain time, and the processing flow proceeds to step St115. That is, it is determined here that the unused part of the transfer film 46 is deteriorated due to heat because of long time standby.

Then, in step St115, the transfer film 46 is forcibly moved such that a different film part of the transfer film 46 is positioned between the heating roller 33 and transfer platen 31 so as to prevent the unused part from being adversely affected by heat.

Thereafter, a cause that prevents the transfer film 46 from being moved for subsequent processing even after elapse of the certain time is eliminated and, when the card reaches the medium standby section E, the transfer film 46 is moved back to the film standby section F in step St116, and transfer of an image onto the card from the transfer film 46 is performed in step St117.

When it is detected in step St114 that the card exists at the medium standby section E, the processing flow directly proceeds to step St117.

Figure 14:
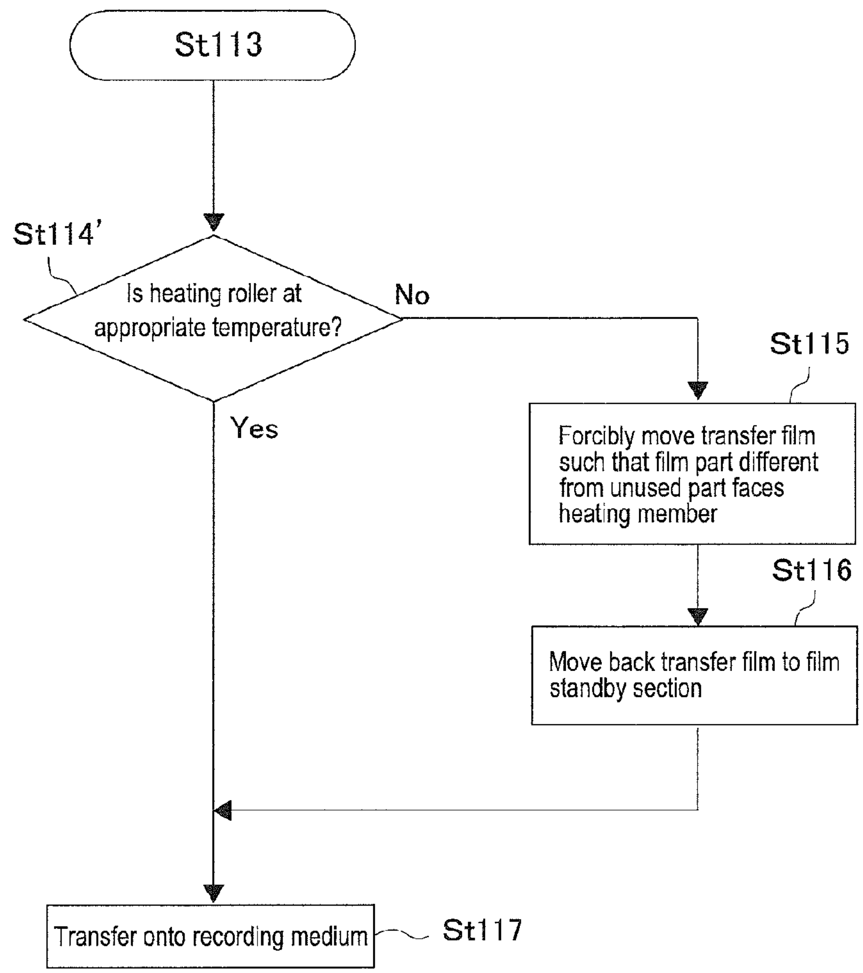
FIG. 14 is a flowchart in which a part of the procedure in the flowchart of FIG. 13 is modified.

In the above example, the determination in step St114 on whether the unused part of the transfer film 46 in a state of being stopped for a certain time period between the heating roller 33 and transfer platen 31 can be moved for subsequent transfer processing is made by detecting whether or not the card is positioned at the medium standby section E. Alternatively, as illustrated in step St114' of a flowchart of FIG. 14, the determination in step St114 may be made by detecting whether or not the heating roller 33 as the heating member is at an appropriate temperature. When it is detected in step St114' that the heating roller 33 is not at the appropriate temperature, the transfer film 46 needs to stand by for a certain time period or more at the film standby section F until the temperature of the heating roller 33 increases (or decrease) to the appropriate value. Thus, processing of step St115 is performed so as to prevent the unused part from being adversely affected by heat. In this case, the temperature of the heating roller 33 is once detected at a stage where the transfer film 46 reaches the film standby section F and, when the heating roller 33 is not at an appropriate temperature, the temperature of the heating roller 33 is detected once again after elapse of a certain time period (e.g., two seconds).

In step St115, the transfer film 46 is forcibly moved such that a different film part of the transfer film 46 is positioned between the heating roller 31 and transfer platen 31. The different film part is preferably a used part of the transfer film 46 that is used for previous transfer of an image onto the card.

Thereafter, when the heating roller reaches an appropriate temperature, the transfer film 46 is moved back to the film standby section F in step St116, and transfer of an image onto the card from the transfer film 46 is performed in step St117.

Alternatively, the determination on whether the unused part of the transfer film 46 in a state of being stopped for a certain time period between the heating roller 33 and transfer platen 31 can be moved for subsequent transfer processing may be made based on both results of determination on whether or not the card exists at the medium standby section E (step St114) and determination on whether the heating roller 33 is at an appropriate temperature (step 114'). In this case, both of the conditions where the card exists at the medium standby section E and where heating roller 33 is at an appropriate temperature are met, the image transfer processing onto the card is executed. However, when the two conditions are not met at the same time, the transfer film 46 is forcibly moved such that a different part of the transfer film 46 is positioned between the heating roller 33 and transfer platen 31 and, thereafter, the transfer film 46 is moved back to the film standby section F for the image transfer processing onto the card after the both conditions are met.

Figure 15:
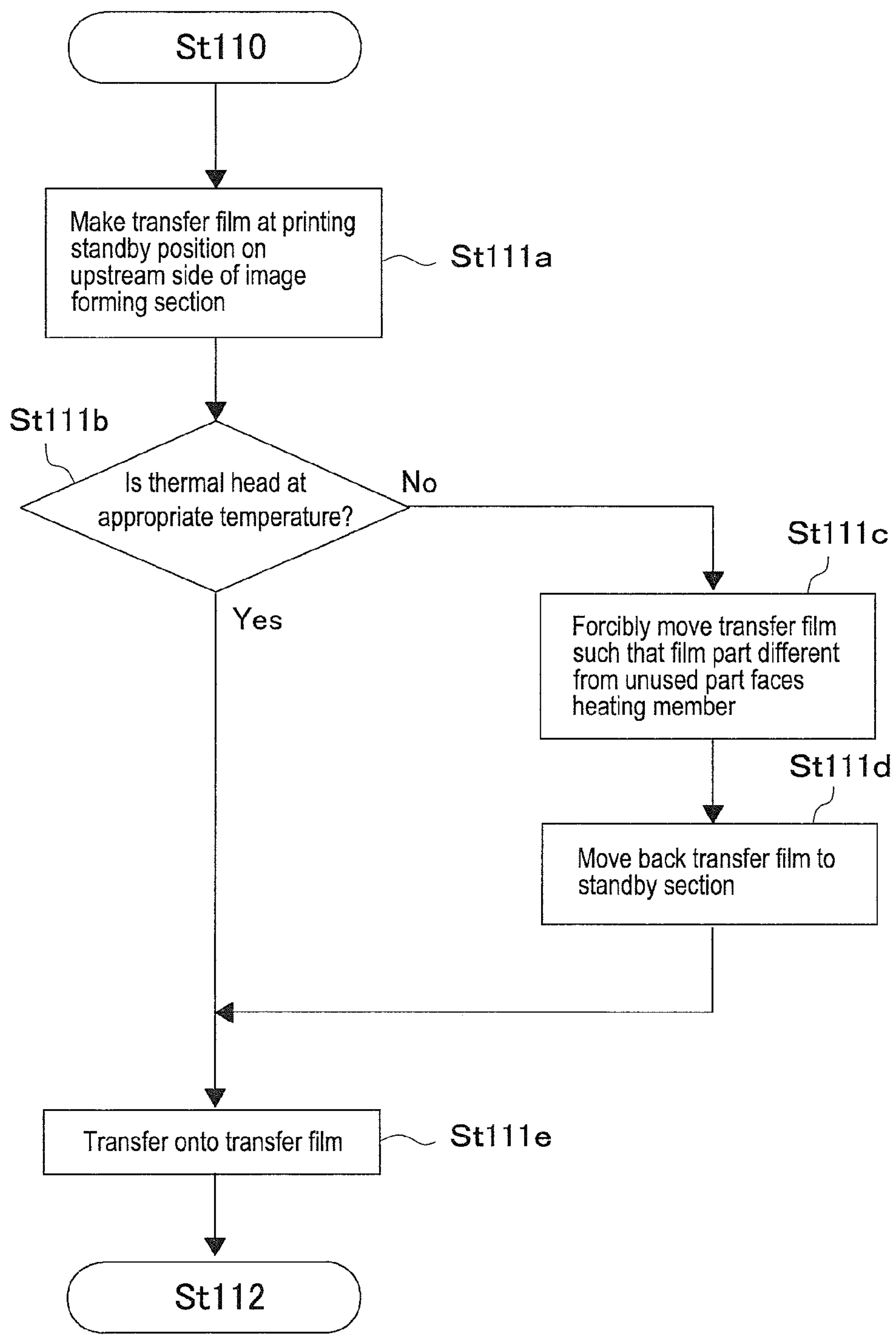
FIG. 15 is a flowchart illustrating a concrete control method when the printing method of FIG. 12 is used for the image forming section D.

Also in the image forming operation on the transfer film 46 in step St112 of the flowchart of FIG. 13, operation for preventing the transfer film 46 from being adversely affected by heat is performed. FIG. 15 concretely illustrates processing of step St112.

When the processing flow proceeds from St 110 (FIG. 13) to St111*a* in FIG. 15, the transfer film 46 is made to stand by at the printing standby position on the upstream side of the image forming section D. Also in this state, the unused part of the transfer film 46 is positioned between the heating roller 33 and transfer platen 31.

In step St117*b*, it is determined whether the unused part of the transfer film 46 in a state of being stopped for a certain time period between the heating roller 33 and transfer platen 31 can be moved for subsequent image forming processing on the transfer film 46 is made by detecting whether or not the thermal head 40 is at an appropriate temperature. In this case, the temperature of the thermal head 40 is once detected at a stage where the transfer film 46 reaches the printing standby position and, when the thermal head 40 is not at an appropriate temperature, the temperature of the thermal head 40 is detected once again after elapse of a certain time period (e.g., two seconds). When it is detected in the second temperature detection that the thermal head 40 is not at the appropriate temperature, the transfer film 46 needs to stand by for a certain time period or more at the printing standby position until the temperature of the thermal head 40 increases (or decrease) to the appropriate value. Thus, processing of step st111*c* is performed so as to prevent the unused part from being adversely affected by heat.

In step St111*c*, the transfer film 46 is forcibly moved such that a different film part of the transfer film 46 is positioned between the thermal head 40 and image forming platen 45.

Also in this case, the different film part is preferably a used part of the transfer film 46 that is used for previous transfer of an image onto the card.

Thereafter, when the thermal head 40 reaches an appropriate temperature, the transfer film 46 is moved back to the printing standby position in step St111*d*, and transfer of an image onto the card from the transfer film 46 is performed in step St111*e*. When it is detected in step St111*b* that the thermal head 40 is at an appropriate temperature, the processing flow directly proceeds to step St111*e*.

INDUSTRIAL APPLICABILITY

The present invention relates to a printing apparatus and a printing method that form an image based on text data, image data, and the like onto a recording medium such as a card and has industrial applicability.

REFERENCE SIGNS LIST

20: Reversing unit (Reversing section)
23: Non-contact IC recording unit
24: Magnetic recording unit
25: Reject stacker
31: Transfer platen (platen roller)
33: Heating roller
40: Thermal head
41: Ink ribbon
42: Ribbon cassette
43: Supply spool
44: Winding spool
45: Image forming platen
46: Intermediate transfer film
46*b*: Blank part (unused part)
46*e*: Used part
46*g*: Image forming part
47: Winding spool
48: Supply spool
49: Conveying roller
50: Film cassette
76: Determination unit
E: Medium standby section
F: Film standby section
P1: First conveying path
P2: Second conveying path
P3: Third conveying path
P4: Film path (film conveying path)
P5: Discharge path
Mr1: Wind motor
Mr2: Winding motor
Mr3: Unwinding motor

The invention claimed is:

1. A printing apparatus that transfers an image formed on a transfer film onto a recording medium, comprising:

a medium supply section configured to supply the recording medium;

an image forming section configured to form an image on the transfer film;

a transfer section configured to transfer the image formed on the transfer film onto the recording medium;

a supply section configured to supply the transfer film;

a film winding section configured to winding the transfer film supplied from the film supply section;

a medium conveying path along which the recording medium supplied from the medium supply section is conveyed to the transfer section through an information recording section;

a film conveying path along which the transfer film supplied from the film supply section is conveyed to the transfer section through the image forming section;

a film standby section provided on the film conveying path, at which the transfer film is made to stand by temporarily;

a drive unit connected to at least one of the film supply section and film winding section; and a controller configured to control the drive unit, wherein the transfer section is provided with a transfer platen that supports the recording medium and a heating member that press holds the recording medium and transfer film with the transfer platen, and the controller moves, when making the transfer film to be conveyed from the film supply section to the transfer section stand by temporarily, the transfer film such that a film part that faces the heating member is changed to another film part in a case where the same film part is exposed to the heating member for a predetermined time period or more.

2. The printing apparatus according to claim 1, wherein the controller includes a determination unit that determines whether or not a film part that faces the heating member is changed to another film part based on a signal for detecting at least one of a movement state of the transfer film and recording medium to be moved toward the transfer section, an information recording state in the recording medium, and an image forming state on the transfer film.

3. The printing apparatus according to claim 2, wherein the determination unit determines whether or not a film part that faces the heating member is changed to another film part at at least one of timings at which the transfer film reaches the image forming section, at which the transfer film reaches the film standby section, and at which the recording medium reaches the medium standby section.

4. The printing apparatus according to claim 1, wherein the controller moves, based on a result of the determination made by the determination unit, the transfer film to a position at which a used part of the transfer film faces the heating member.

5. The printing apparatus according to claim 1, wherein the controller changes the film part that faces the heating member by moving the transfer film at low speed in an unwinding or winding direction.

6. A printing apparatus that transfers an image formed on a transfer film onto a recording medium, comprising:

a film supply section around which an unused part of the transfer film is wound;

a film winding section around which a used part of the transfer film is wound;

a drive unit configured to drive the film supply section and film winding section;

an image forming section configured to form an image on the transfer film;

a transfer section provided between the film supply section and image forming section and configured to transfer the image formed at the image forming section onto the recording medium while holding the transfer film and recording medium between a heating member and a transfer platen;

a determination unit configured to determine whether or not an unused part of the transfer film in a state of being stopped for a certain time period between the heating member and transfer platen can be moved for subsequent processing; and a controller configured to control the drive unit, when it is determined by the determination unit that the transfer film cannot be moved, so as to allow the film supply section to wind up the transfer film such that a used part of the transfer film is interposed between the heating member and transfer platen.

7. The printing apparatus according to claim 6, wherein the determination unit detects whether or not the recording medium is positioned at a transfer starting position in a time period after the image is formed on the transfer film at the image forming section and before transfer processing is performed at the transfer section and, when the recording medium is not positioned at the transfer starting position, determines that the unused part of the transfer film interposed between the heating member and transfer platen for a certain time period cannot be moved for subsequent processing.

8. The printing apparatus according to claim 6, wherein the determination unit detects whether or not the heating member is at an appropriate temperature in a time period after the image is formed on the transfer film at the image forming section and before transfer processing is performed at the transfer section and, when the heating member is not at an appropriate temperature, determines that the unused part of the transfer film interposed between the heating member and transfer platen for a certain time period cannot be moved for subsequent processing.

9. A printing method that uses a printing apparatus provided with an image forming section that forms an image on a transfer film and a transfer section that transfers the image formed on the transfer film onto a recording medium using a heating member and a transfer platen, comprising:

a heating step of heating the heating member;

a film supply step that supplies the transfer film;

a film standby step that makes the transfer film temporarily in a state where an unused part of the transfer film is positioned between the heating member and transfer platen;

a determination step that determines whether the unused part of the transfer film in a state of being stopped for a certain time period between the heating member and transfer platen can be moved for subsequent processing; and a film winding step of forcibly moving the transfer film, when it is determined by the determination step that the transfer film cannot be moved, such that a different film part of the transfer film faces the heating member.

10. The printing method according to claim 9, wherein the film standby step makes the transfer film stand by in a time period after image forming processing on the transfer film by the image forming section and before image transfer processing onto the recording medium by the transfer section, and the determination step determines whether or not the recording medium is positioned at a transfer starting position in a state where the unused part of the transfer film is stopped for a certain time period between the heating member and transfer platen and, when the recording medium is not positioned at the transfer starting position, determines that the unused part of the transfer film in a state of being stopped for a certain time period between the heating member and transfer platen cannot be moved for the image transfer processing.

11. The printing method according to claim 9, wherein the film standby step makes the transfer film stand by in a time period after image forming processing on the transfer film by the image forming section and before image transfer processing onto the recording medium by the transfer section, and the determination step determines whether or not the heating member is at an appropriate temperature in a state where the unused part of the transfer film is stopped for a certain time period between the heating member and transfer platen and, when the heating member is not at an appropriate temperature, determines that the unused part of the transfer film in a state of being stopped for a certain time period between the heating member and transfer platen cannot be moved for the image transfer processing.

12. The printing method according to claim 9, wherein the film standby step makes the transfer film stand by before image forming processing on the transfer film by the image forming section, and the determination step determines whether or not a thermal head in the image forming section is at an appropriate temperature in a state where the unused part of the transfer film is stopped for a certain time period between the heating member and transfer platen and, when the thermal head is not at an appropriate temperature, determines that the unused part of the transfer film in a state of being stopped for a certain time period between the heating member and transfer platen cannot be moved for the image forming processing.

13. The printing method according to claim 9, wherein the film winding step winds up the transfer film such that the used part of the transfer film is interposed between the heating member and transfer platen.

* * * * *